(12) United States Patent
Corpus et al.

(10) Patent No.: US 11,493,091 B2
(45) Date of Patent: Nov. 8, 2022

(54) PROPELLER SHAFT CRASH COLLAPSE ASSEMBLY

(71) Applicant: DANA AUTOMOTIVE SYSTEMS GROUP, LLC, Maumee, OH (US)

(72) Inventors: Christopher B. Corpus, Grand Rapids, OH (US); Jeffrey A. Dutkiewicz, Ottawa Hills, OH (US); Bao T. Luong, Lambertville, MI (US); Thomas J. Marriott, Temperance, MI (US); Leah N. Matczak, Maumee, OH (US)

(73) Assignee: Dana Automotive Systems, Group, LLC, Maumee, OH (US)

( * ) Notice: Subject to any disclaimer, the term of this patent is extended or adjusted under 35 U.S.C. 154(b) by 365 days.

(21) Appl. No.: 16/638,807

(22) PCT Filed: Aug. 24, 2018

(86) PCT No.: PCT/US2018/047968
§ 371 (c)(1),
(2) Date: Feb. 13, 2020

(87) PCT Pub. No.: WO2019/040880
PCT Pub. Date: Feb. 28, 2019

(65) Prior Publication Data
US 2021/0131499 A1    May 6, 2021

Related U.S. Application Data

(60) Provisional application No. 62/550,305, filed on Aug. 25, 2017.

(51) Int. Cl.
*F16D 3/12* (2006.01)
*F16C 3/02* (2006.01)
(Continued)

(52) U.S. Cl.
CPC ............ *F16D 3/12* (2013.01); *F16C 3/023* (2013.01); *F16C 3/03* (2013.01); *F16D 9/04* (2013.01);
(Continued)

(58) Field of Classification Search
CPC ..... F16D 3/12; F16D 9/04; F16D 9/08; F16D 2003/22313; F16C 3/023; F16C 3/03; F16C 2326/06; F16C 2361/41; Y10T 403/11
(Continued)

(56) References Cited

U.S. PATENT DOCUMENTS 3,067,593 A * 12/1962 Mccool ................. E21B 17/042
                                                         464/183
6,328,656 B1 * 12/2001 Uchikawa .............. B60K 17/22
                                                         464/183
(Continued)

FOREIGN PATENT DOCUMENTS

CN    105299027    2/2016
DE    102005029754  12/2006
(Continued)

OTHER PUBLICATIONS

European Patent Office, International Search Report with Written Opinion in application PCT/US2018/047968, dated Nov. 30, 2018, 12 pages, Rijswijk, Netherlands.

*Primary Examiner* — Greg Binda
(74) *Attorney, Agent, or Firm* — Marshall & Melhorn, LLC

(57) ABSTRACT

A shaft assembly. The shaft assembly includes a joint assembly having a first joint member, a second joint member and one or more third joint members drivingly connecting said first and second joint members. At least a portion of a first shaft is drivingly connected to the second joint member.

(Continued)

Circumferentially extending from at least a portion of an outer surface of a second end portion of the first shaft is a first and second increased diameter portion having a wall portion that connects the first increased diameter portion to the second increased diameter portion. Drivingly connected to the second increased diameter portion of the first shaft is a second shaft. During a crash condition, an amount of force is applied to the wall portion until it fractures and at least a portion of the first shaft and/or the joint assembly translates into a hollow portion of the second shaft.

21 Claims, 13 Drawing Sheets

(51) Int. Cl.
  *F16C 3/03* (2006.01)
  *F16D 9/04* (2006.01)
  *F16D 9/08* (2006.01)
  *F16D 3/223* (2011.01)

(52) U.S. Cl.
  CPC ...... *F16C 2326/06* (2013.01); *F16C 2361/41* (2013.01); *F16D 9/08* (2013.01); *F16D 2003/22313* (2013.01); *Y10T 403/11* (2015.01)

(58) Field of Classification Search
  USPC ...................................... 464/182, 183; 403/2
  See application file for complete search history.

(56) References Cited

U.S. PATENT DOCUMENTS

| | | | |
|---|---|---|---|
| 6,368,225 | B1 | 4/2002 | Breese |
| 6,371,859 | B1 | 4/2002 | Gibson |
| 6,543,266 | B1 | 4/2003 | Jaekel |
| 6,585,601 | B2 | 7/2003 | Booker |
| 6,666,772 | B1 | 12/2003 | Cheney |
| 6,896,623 | B2 | 5/2005 | Creek |
| 7,080,437 | B2 | 7/2006 | Da Silva |
| 7,288,029 | B1 | 10/2007 | Lyon |
| 9,303,695 | B2 | 4/2016 | Choi |
| 11,047,426 | B2 * | 6/2021 | Wehner ............... F16D 1/116 |
| 2017/0363152 | A1 * | 12/2017 | Schmicker ............ F16D 1/068 |
| 2020/0370603 | A1 * | 11/2020 | Mabe .................... F16F 7/125 |

FOREIGN PATENT DOCUMENTS

| | | |
|---|---|---|
| DE | 102008048388 | 3/2010 |
| DE | 102014115269 | 4/2016 |
| DE | 102015219464 | 4/2017 |

* cited by examiner

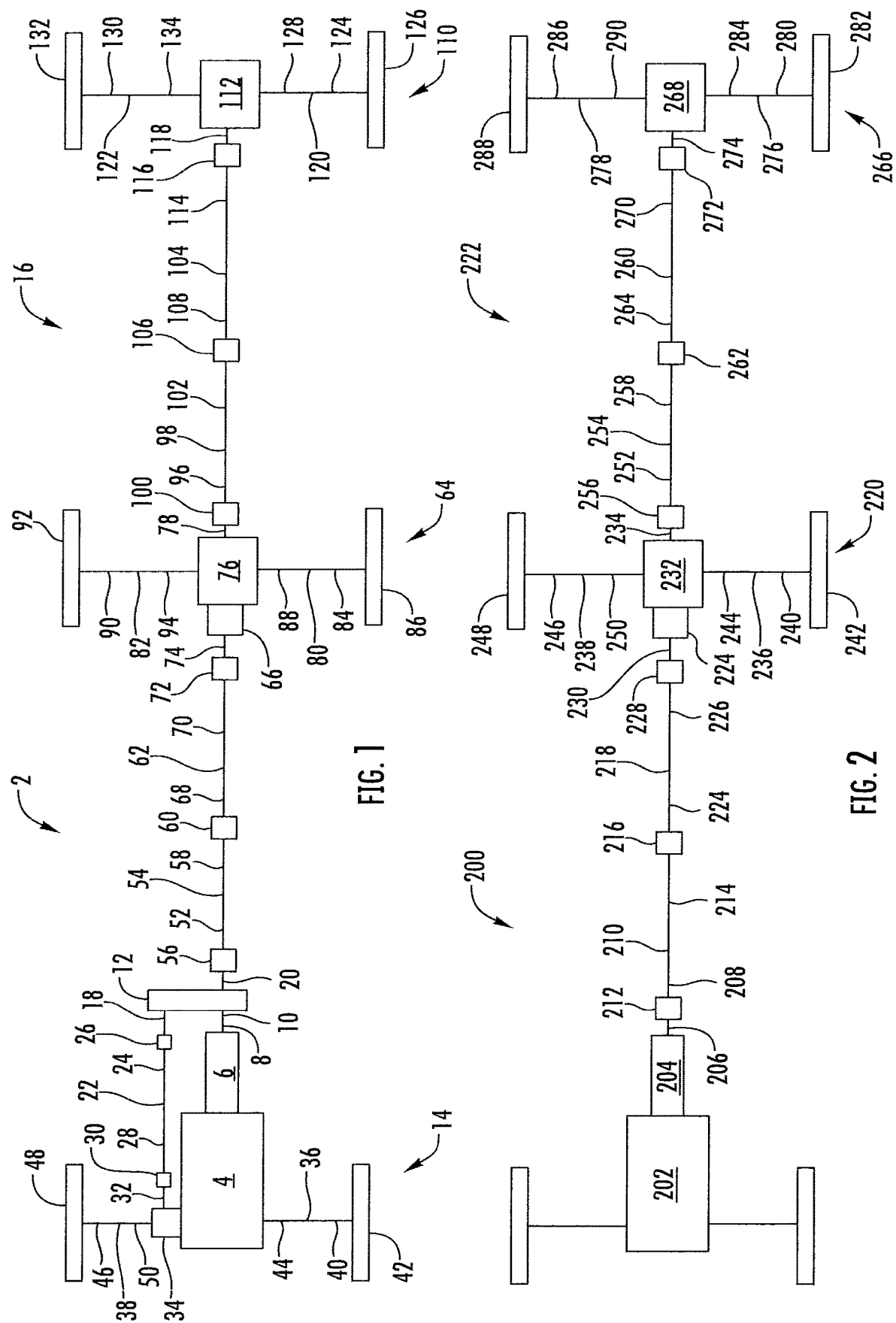

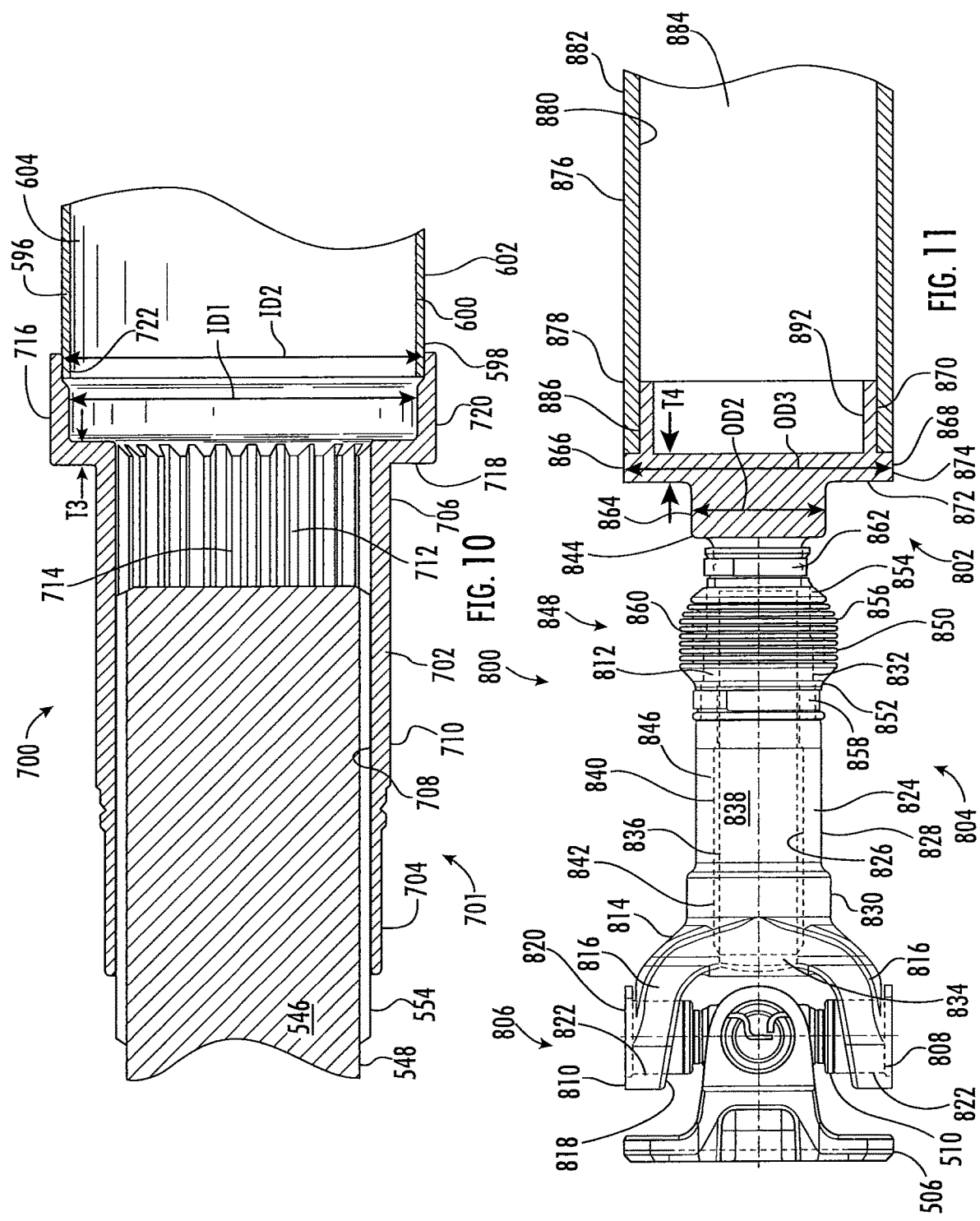

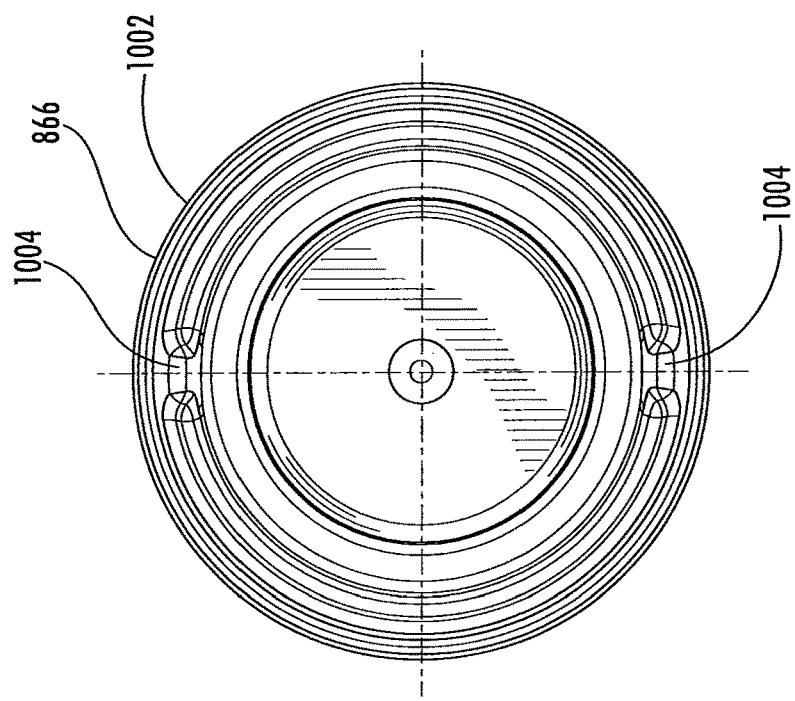
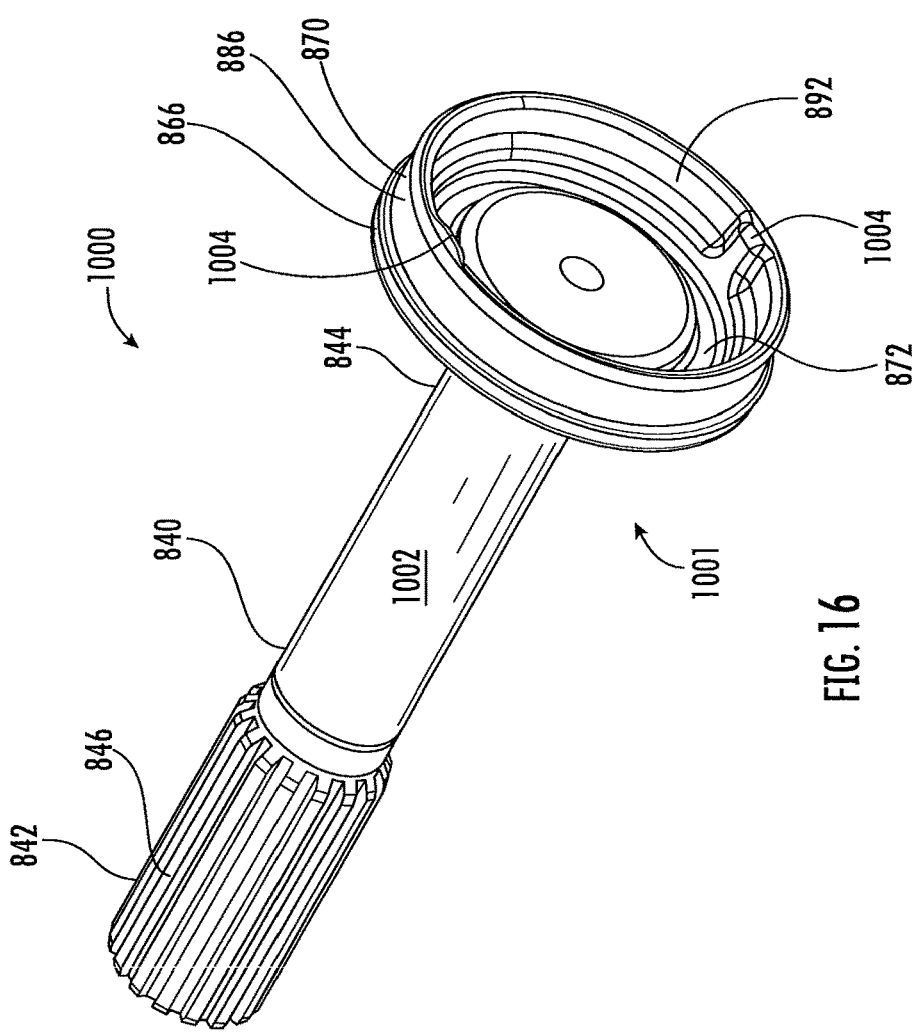
FIG. 16A
FIG. 16

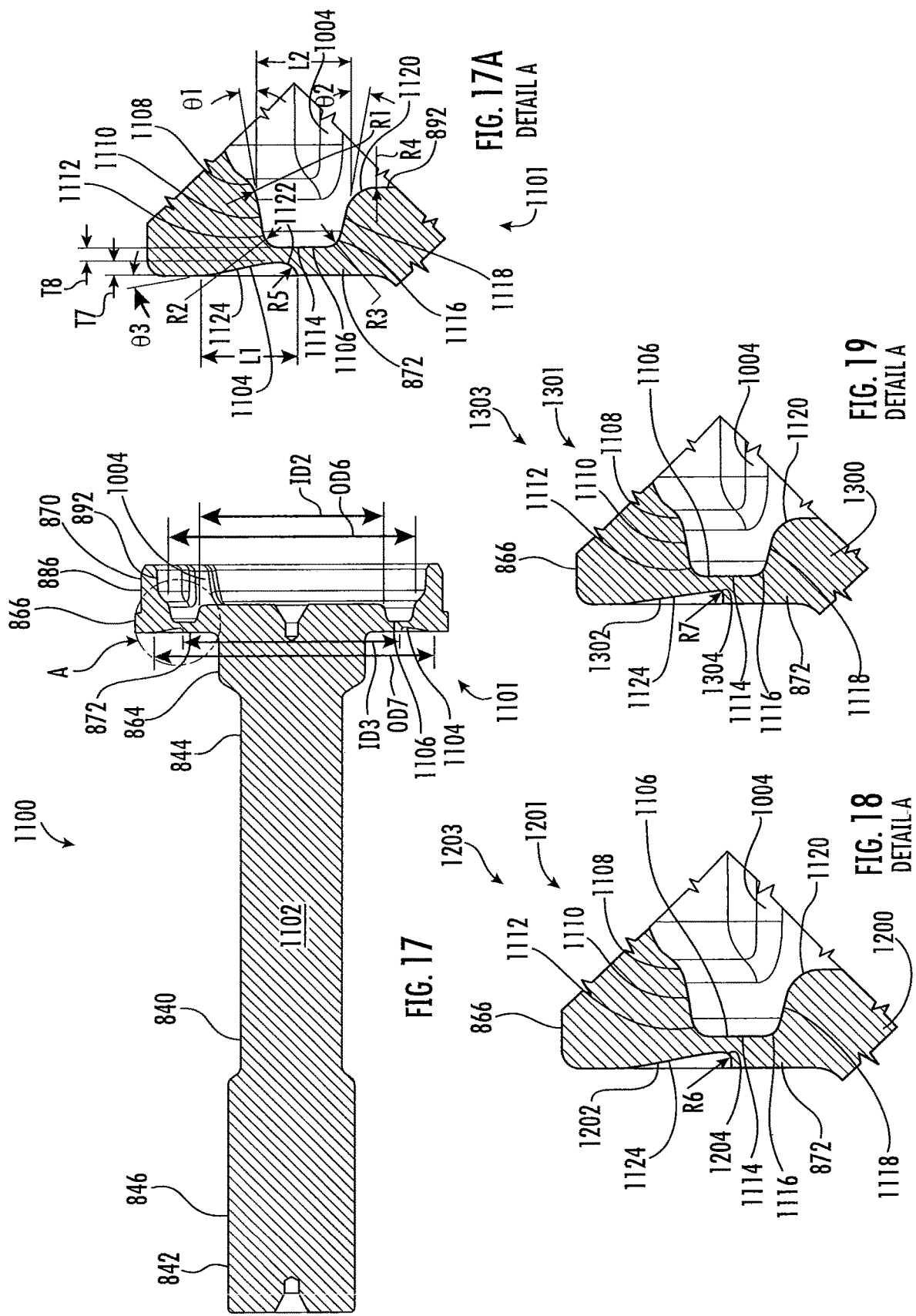

PROPELLER SHAFT CRASH COLLAPSE ASSEMBLY

CROSS-REFERENCE TO RELATED APPLICATIONS

The present application is the National Stage of International Application No. PCT/US2018/047968, filed Aug. 24, 2018, which claims the benefit of U.S. Provisional Patent Application No. 62/550,305, filed on Aug. 25, 2017 which is incorporated herein by reference in its entirety.

FIELD OF THE DISCLOSURE

The present disclosure relates to a propeller shaft assembly having a crash collapse assembly.

BACKGROUND OF THE DISCLOSURE

Many vehicles incorporate the use of one or more propeller shaft assemblies to transfer the rotational energy generated by a motor of a vehicle to one or more axle assemblies. It is well known within the industry to use one or more propeller shaft assemblies to transmit the rotational power of the motor to the one or more axle assemblies when the distance between the axle assemblies or the distance between the motor and the axle assemblies is relatively large. In order to transmit the torque from one shaft to another, the propeller shaft assemblies utilize one or more constant velocity joint assemblies or universal joint assemblies. The constant velocity joint or universal joint assemblies allow one shaft to transmit torque to another shaft when the shafts are non-coaxial or at least one of the shafts have a variable angle in operation.

The problem with many conventional propeller shaft assemblies is that when the vehicle experiences a crash condition, the propeller shaft(s) buckle and penetrate the passenger compartment of a vehicle injuring the passenger(s). Additionally, as a result of the force(s) transmitted through the propeller shaft assembly during the crash condition, the propeller shaft(s) tend to cause damage to other vehicle components that are in close proximity to or are connected to the propeller shaft assembly. It would therefore be advantageous to create a safer propeller shaft assembly that is capable of absorbing at least a portion of the force(s) generated during a crash without injuring passenger(s), buckling and/or damaging nearby vehicle components. Additionally, it would be advantageous to create a propeller shaft assembly that incorporates the use of a customizable crash collapse assembly that may be utilized over a wide range of applications.

SUMMARY OF THE DISCLOSURE

A shaft assembly for use in a vehicle. The shaft assembly includes a joint assembly having a first joint member, a second joint member and one or more third joint members drivingly connecting the first joint member to the second joint member. At least a portion of a first shaft is drivingly connected to at least a portion of the second joint member of the joint assembly. Circumferentially extending from at least a portion of an outer surface of a second end portion of the first shaft is a first increased diameter portion and a second increased diameter portion. A wall portion connects at least a portion of the first increased diameter portion to the second increased diameter portion of the first shaft. Drivingly connected to at least a portion of the second increased diameter portion of the first shaft is a second shaft. During a crash condition, an amount of force is applied to the wall portion until it fractures and at least a portion of the first shaft and/or the joint assembly translates axially into a hollow portion of the second shaft.

BRIEF DESCRIPTION OF THE FIGURES

The above, as well as other advantages of the present disclosure, will become readily apparent to those skilled in the art from the following detailed description when considered in light of the accompanying drawings in which:

FIG. 1 is a schematic top-plan view of a vehicle having one or more shaft assemblies according to an embodiment of the disclosure;

FIG. 2 is a schematic top-plan view of another vehicle having one or more shaft assemblies according to an embodiment of the disclosure;

FIG. 10 is a cut-away schematic side-view of a portion of the crash collapse assembly illustrated in FIGS. 5-9 according to an alternative embodiment of the disclosure;

FIG. 11 is a partial cut-away schematic side-view of a shaft assembly having a joint assembly according to another embodiment of the disclosure when the shaft assembly is in a first position;

FIG. 16 is a schematic perspective view of a portion of the shaft collapse assembly illustrated in FIGS. 5-15 according to yet another embodiment of the disclosure; FIG. 16A is a schematic front-view of a portion of the shaft assembly illustrated in FIG. 16 of the disclosure;

FIG. 17 is a cut-away schematic side-view of a portion of the shaft assembly illustrated in FIGS. 5-16A according to still yet another embodiment of the disclosure;

FIG. 17A is a cut-away schematic detail view of a portion of the one more first and second crash collapse features of the crash collapse assembly of the shaft assembly illustrated in FIG. 17;

FIG. 18 is a cut-away schematic detail view of a portion of the one more first crash collapse features illustrated in FIGS. 17 and 17A according to an alternative embodiment of the disclosure;

FIG. 19 is a cut-away schematic detail view of a portion of the one more first crash collapse features illustrated in FIGS. 17-18 according to a further alternative embodiment of the disclosure;

DETAILED DESCRIPTION FO THE DISCLOSURE

Figure 3:
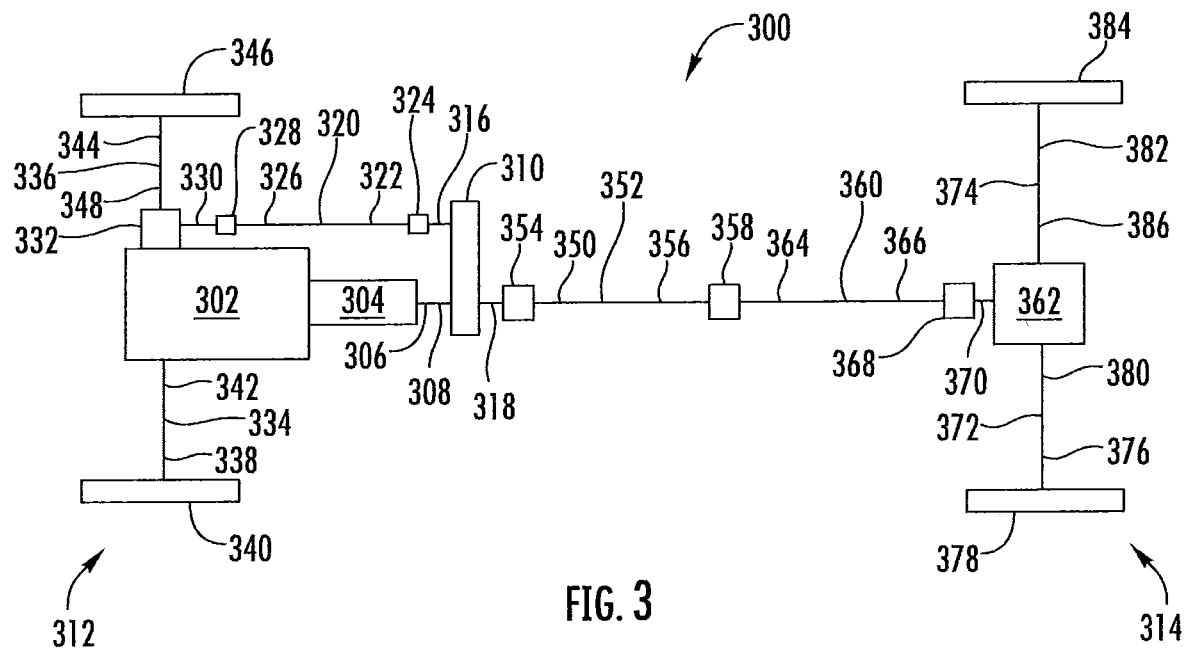
FIG. 3 is a schematic top-plan view of yet another vehicle having one or more shaft assemblies according to an embodiment of the disclosure.

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the shaft assembly disclosed herein may be used in automotive, off-road vehicle, all-terrain vehicle, construction, structural, marine, aerospace, locomotive, military, machinery, robotic and/or consumer product applications. Additionally, as a non-limiting example, the shaft assembly disclosed herein may also be used in passenger vehicle, electric vehicle, hybrid vehicle, commercial vehicle, autonomous vehicles, semi-autonomous vehicles and/or heavy vehicle applications.

FIG. 1 is a schematic top-plan view of a vehicle 2 having one or more shaft assemblies according to an embodiment of the disclosure. The vehicle 2 has an engine 4, which is drivingly connected to a transmission 6. A transmission output shaft 8 is then drivingly connected to an end of the transmission 6 opposite the engine 4. The transmission 6 is a power management system which provides controlled application of the rotational power generated by the engine 4 by means of a gearbox.

The transmission output shaft 8 is drivingly connected to a transfer case input shaft 10, which in turn is drivingly connected to a transfer case 12. The transfer case 12 is used to transfer the rotational power from the transmission 6 to a front axle system 14 and a tandem axle system 16 by utilizing a series of gears and drive shafts. The transfer case 12 includes a first transfer case output 18 shaft and a second transfer case output shaft 20.

A first propeller shaft 22 extends from the first transfer case output shaft 18 to the front axle system 14 of the vehicle 2. A first end portion 24 of the first propeller shaft 22 is drivingly connected to an end of the first transfer case output shaft 18 opposite the transfer case 12 via a first joint assembly 26. As a non-limiting example, the first joint assembly 26 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure, that the first joint assembly 26 may be drivingly connected to the first end portion 24 of the first propeller shaft 22 by using a crash collapse assembly according to an embodiment of the disclosure.

As illustrated in FIG. 1 of the disclosure, second end portion 28 of the first propeller shaft 22 is drivingly connected to a second joint assembly 30. As a non-limiting example, the second joint assembly 30 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the second joint assembly 30 may be drivingly connected to the second end portion 28 of the first propeller shaft 22 by using a crash collapse assembly according to an embodiment of the disclosure.

Drivingly connected to an end of the second joint assembly 30 is an end of a front axle system input shaft 32. As a non-limiting example, the front axle system input shaft 32 is a front axle differential input shaft, a coupling shaft, stub shaft or a front axle differential pinion shaft. Drivingly connected to an end of the front axle system input shaft 32 opposite the first propeller shaft 22 is a front axle differential 34. The front axle differential 34 is a set of gears that allows the outer drive wheel(s) of the wheeled vehicle to rotate at a faster rate that the inner drive wheel(s). The rotational power is transmitted through the front axle system 14 as described in more detail below.

The front axle system 14 further includes a first front axle half shaft 36 and a second front axle half shaft 38. The first front axle half shaft 36 extends substantially perpendicular to the front axle system input shaft 32. A first end portion 40 of the first front axle half shaft 36 is drivingly connected to a first front axle wheel assembly 42 and a second end portion 44 of the first front axle half shaft 36 is drivingly connected to an end of the front axle differential 34. As a non-limiting example, the second end portion 44 of the first front axle half shaft 36 is drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 32 is the second front axle half shaft 38. A first end portion 46 of the second front axle half shaft 38 is drivingly connected to a second front axle wheel assembly 48. A second end portion 50 of the second front axle half shaft 38 is drivingly connected to an end of front axle differential 34 opposite the first front axle half shaft 36. As anon-limiting example, the second end portion 50 of the second front axle half shaft 38 is drivingly connected to a front axle differential side gear, a separate stub shaft, a separate coupling shaft, a second front axle differential output shaft and/or a shaft that is formed as part of a front axle differential side gear.

An end of the second transfer case output shaft 20 is drivingly connected to an end of the transfer case 12 opposite the transfer case input shaft 10. As illustrated in FIG. 1 of the disclosure, a first end portion 52 of a second propeller shaft 54 is drivingly connected to an end of the second transfer case output shaft 20 opposite the transfer case 12 via a third joint assembly 56. As non-limiting example, the third joint assembly 56 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the third joint assembly may be drivingly connected to the first end portion 52 of the second propeller shaft 54 by using a crash collapse assembly according to an embodiment of the disclosure.

As illustrated in FIG. 1 of the disclosure, a second end portion 58 of the second propeller shaft 54 is drivingly connected to a fourth joint assembly 60. As a non-limiting example, the fourth joint assembly 60 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the fourth joint assembly 60 may be drivingly connected to the second end portion 58 of the second propeller shaft 54 by using a crash collapse assembly according to an embodiment of the disclosure.

Drivingly connected to an end of the fourth joint assembly 60, opposite the second propeller shaft 54, is a third propeller shaft 62. The third propeller shaft 62 drivingly connects the transfer case 12 to a forward tandem axle system 64 of the tandem axle system 16 having an inter-axle differential 66. As illustrated in FIG. 1 of the disclosure, a first end portion 68 of the third propeller shaft 62 is drivingly connected to an end of the fourth joint assembly 60 opposite the second propeller shaft 54. It is within the scope of this disclosure and as a non-limiting example that the fourth joint assembly 60 may drivingly connected to the third propeller shaft 62 by using a crash collapse assembly according to an embodiment of the disclosure.

A second end portion 70 of the third propeller shaft 62 is drivingly connected to an end of a fifth joint assembly 72. As a non-limiting example, the fifth joint assembly 72 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the fifth joint assembly 72 may be drivingly connected to the second end portion 70 of the third propeller shaft 62 by using a crash collapse assembly according to an embodiment of the disclosure.

Drivingly connected to an end of the fifth joint assembly 72, opposite the third propeller shaft 62, is an end of a forward tandem axle system input shaft 74. An end of the forward tandem axle system input shaft 74, opposite the third propeller shaft 62, is drivingly connected to the inter-axle differential 66 of the forward tandem axle system 64. As a non-limiting example, the forward tandem axle system input shaft 74 is an inter-axle differential input shaft, a coupling shaft, stub shaft or an inter-axle differential pinion shaft. The inter-axle differential 66 is a device that divides the rotational power generated by the engine 4 between the axles in a vehicle 2. The rotational power is transmitted through the forward tandem axle system 64 as described in more detail below.

As illustrated in FIG. 1 of the disclosure, the inter-axle differential 66 is drivingly connected to a forward tandem axle differential 76 and a forward tandem axle system output shaft 78. The forward tandem axle differential 76 is a set of gears that allows the outer drive wheel(s) of a wheeled vehicle to rotate at a faster rate than the inner drive wheel(s).

The forward tandem axle system 64 further includes a first forward tandem axle half shaft 80 and a second forward tandem axle half shaft 82. The first forward tandem axle half shaft 80 extends substantially perpendicular to the forward tandem axle system input shaft 74. A first end portion 84 of the first forward tandem axle half shaft 80 is drivingly connected to a first forward tandem axle wheel assembly 86 and a second end portion 88 of the first forward tandem axle half shaft 80 is drivingly connected to an end of the forward tandem axle differential 76. As a non-limiting example, the second end portion 88 of the first forward tandem axle half shaft 80 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 74 is the second forward tandem axle half shaft 82. A first end portion 90 of the second forward tandem axle half shaft 82 is drivingly connected to a second forward tandem axle wheel assembly 92. A second end portion 94 of the second forward tandem axle half shaft 82 is drivingly connected to an end of the forward tandem axle differential 76 opposite the first forward tandem axle half shaft 80. As a non-limiting example, the second end portion 94 of the second forward tandem axle half shaft 82 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 78 is drivingly connected to a side of the inter-axle differential 66 opposite the third propeller shaft 62. An end of the forward tandem axle system output shaft 78, opposite the inter-axle differential 66, is drivingly connected to a first end portion 96 of a fourth propeller shaft 98 via a sixth joint assembly 100. As a non-limiting example, the sixth joint assembly 100 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the sixth joint assembly 100 may be drivingly connected to the first end portion 96 of the fourth propeller shaft 98 by using a crash collapse assembly according to an embodiment of the disclosure.

A second end portion 102 of the fourth propeller shaft 98 is drivingly connected to a fifth propeller shaft 104 via a seventh joint assembly 106. As a non-limiting example, the seventh joint assembly 106 may be a universal joint assembly, a U-joint assembly, a cardan joint assembly, a double cardan joint assembly, a Hooke's joint assembly, a-Spicer joint assembly, a homokinetic joint assembly, a constant velocity joint assembly or a Hardy Spicer joint assembly. It is within the scope of this disclosure and as a non-limiting example that the seventh joint assembly 106 may be drivingly connected to the second end portion 102 of the fourth propeller shaft 98.

As illustrated in FIG. 1 of the disclosure, a first end portion 108 of the fifth propeller shaft 104 is drivingly connected to an end of the seventh joint assembly 106. The fifth propeller shaft 104 drivingly connects the inter-axle differential 66 to a rear tandem axle system 110 having a rear tandem axle differential 112. It is within the scope of this disclosure and as a non-limiting example that the seventh joint assembly 106 may be drivingly connected to the first end portion 108 of the fifth propeller shaft 104 by using a crash collapse assembly according to an embodiment of the disclosure.

Additionally, as illustrated in FIG. 1 of the disclosure, a second end portion 114 of the fifth propeller shaft 104 is drivingly connected to an end of an eighth joint assembly 116. As a non-limiting example, the eighth joint assembly 116 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the eighth joint assembly 116 may be drivingly connected to the second end portion 114 of the fifth propeller shaft 104 by using a crash collapse assembly according to an embodiment of the disclosure.

Drivingly connected to an end of the eighth joint assembly 116, opposite the fifth propeller shaft 104, is an end of a rear tandem axle system input shaft 118. As a non-limiting example, the rear tandem axle input shaft 118 is a rear tandem axle differential input shaft, a coupling shaft, stub shaft or a rear tandem axle differential pinion shaft. Drivingly connected to an end of the rear tandem axle input shaft 118, opposite the fifth propeller shaft 104, is the rear tandem axle differential 112. The rear tandem axle differential 112 is a set of gears that allows the outer drive wheel(s) of the wheeled vehicle to rotate at a faster rate that the inner drive wheel(s). The rotational power is transmitted through the rear tandem axle system 110 as described in more detail below.

The rear tandem axle system 110 further includes a first rear tandem axle half shaft 120 and a second rear tandem axle half shaft 122. The first rear tandem axle half shaft 120 extends substantially perpendicular to the rear tandem axle system input shaft 118. A first end portion 124 of the first rear tandem axle half shaft 120 is drivingly connected to a first rear tandem axle wheel assembly 126 and a second end portion 128 of the first rear tandem axle half shaft 120 is drivingly connected to an end of the rear tandem axle differential 112. As a non-limiting example, the second end portion 128 of the first rear tandem axle half shaft 120 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 118 is the second forward tandem axle half shaft 122. A first end portion 130 of the second rear tandem axle half shaft 122 is drivingly connected to a second rear tandem axle wheel assembly 132. A second end portion 134 of the second rear tandem axle half shaft 122 is drivingly connected to an end of the rear tandem axle differential 122 opposite the first rear tandem axle half shaft 120. As a non-limiting example, the second end portion 134 of the second rear tandem axle half shaft 122 is drivingly connected to a rear tandem axle differential side gear, a separate stub shaft, a separate coupling shaft, a second rear tandem axle differential output shaft and/or a shaft that is formed as part of a rear tandem axle differential side gear.

FIG. 2 is a schematic top-plan view of a vehicle 200 having one or more shaft assemblies according to an embodiment of the disclosure. The vehicle 200 has an engine 202, which is drivingly connected to a transmission 204. A transmission output shaft 206 is drivingly connected to an end of the transmission 204 opposite the engine 202. The transmission 204 is a power management system, which provides controlled application of the rotational power generated by the engine by means of a gear box.

A first end portion 208 of a first propeller shaft 210 is drivingly connected to an end of the transmission output shaft 206 opposite the transmission 204 via a first joint assembly 212. As a non-limiting example, the first joint assembly 212 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the first joint assembly 212 may be drivingly connected to the first end portion 208 of the first propeller shaft 210 by using a crash collapse assembly according to an embodiment of the disclosure.

As illustrated in FIG. 2 of the disclosure, a second end portion 214 of the first propeller shaft 210 is drivingly connected to a second joint assembly 216. As a non-limiting example, the second joint assembly 216 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that second joint assembly 216 may be drivingly connected to the second end portion 214 of the first propeller shaft 210 by using a crash collapse assembly according to an embodiment of the disclosure.

Drivingly connected to an end of the second joint assembly 216, opposite the first propeller shaft 210, is a second propeller shaft 218. The second propeller shaft 218 drivingly connects the transmission 204 to a forward tandem axle system 220 of a tandem axle system 222 having an inter-axle differential 224. As illustrated in FIG. 2 of the disclosure, a first end portion 225 of the second propeller shaft 218 is drivingly connected to an end of the second joint assembly 216 opposite the first propeller shaft 210. It is within the scope of this disclosure and as a non-limiting example that the second joint assembly 216 may be drivingly connected to the first end portion 225 of the second propeller shaft 218 by using a crash collapse assembly according to an embodiment of the disclosure.

A second end portion 226 of the second propeller shaft 218 is drivingly connected to an end of a third joint assembly 228. As a non-limiting example, the third joint assembly 228 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the third joint assembly 228 may be drivingly connected to the second end portion 226 of the second propeller shaft 218 by using a crash collapse assembly according to an embodiment of the disclosure.

Drivingly connected to an end of the third joint assembly 228, opposite the second propeller shaft 218, is an end of a forward tandem axle system input shaft 230. An end of the forward tandem axle system input shaft 230, opposite the second propeller shaft 218, is drivingly connected to the inter-axle differential 224 of the forward tandem axle system 220. As a non-limiting example, the forward tandem axle system input shaft 230 is an inter-axle differential input shaft, a coupling shaft, stub shaft or an inter-axle differential pinion shaft. The inter-axle differential 224 is a device that divides the rotational power generated by the engine 204 between the axles in a vehicle 200. The rotational power is transmitted through the forward tandem axle system 220 as described in more detail below.

As illustrated in FIG. 2 of the disclosure, the inter-axle differential 224 is drivingly connected to a forward tandem axle differential 232 and a forward tandem axle system output shaft 234. The forward tandem axle differential 232 is a set of gears that allows the outer drive wheel(s) of a wheeled vehicle to rotate at a faster rate than the inner drive wheel(s).

The forward tandem axle system 220 further includes a first forward tandem axle half shaft 236 and a second front tandem axle half shaft 238. The first forward tandem axle half shaft 236 extends substantially perpendicular to the forward tandem axle system input shaft 230. A first end portion 240 of the first forward tandem axle half shaft 236 is drivingly connected to a first forward tandem axle wheel assembly 242 and a second end portion 244 of the first forward tandem axle half shaft 236 is drivingly connected to an end of the forward tandem axle differential 232. As a non-limiting example, the second end portion 244 of the first forward tandem axle half shaft 236 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 230 is the second front tandem axle half shaft 238. A first end portion 246 of the second forward tandem axle half shaft 238 is drivingly connected to a second forward tandem axle wheel assembly 248. A second end portion 250 of the second forward tandem axle half shaft 238 is drivingly connected to an end of the forward tandem axle differential 232 opposite the first forward tandem axle half shaft 236. As a non-limiting example, the second end portion 250 of the second forward tandem axle half shaft 238 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 234 is drivingly connected to a side of the inter-axle differential 224 opposite the second propeller shaft 218. An end of the forward tandem axle system output shaft 234, opposite the inter-axle differential 224, is drivingly connected to a first end portion 252 of a third propeller shaft 254 via a fourth joint assembly 256. As a non-limiting example, the fourth joint assembly 256 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the fourth joint assembly 256 may be drivingly connected to at least a portion of the first end portion 252 of a third propeller shaft 254 by using a crash collapse assembly according to an embodiment of the disclosure.

A second end portion 258 of the third propeller shaft 254 is drivingly connected to a fourth propeller shaft 260 via a fifth joint assembly 262. As a non-limiting example, the fifth joint assembly 262 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the fifth joint assembly 262 may be drivingly connected to the second end portion 258 of the third propeller shaft 254 by using a crash collapse assembly according to an embodiment of the disclosure.

As illustrated in FIG. 2 of the disclosure, a first end portion 264 of the fourth propeller shaft 260 is drivingly connected to an end of the fifth joint assembly 262. The fourth propeller shaft 260 drivingly connects the inter-axle differential 224 to a rear tandem axle system 266 having a rear tandem axle differential 268. It is within the scope of this disclosure and as a non-limiting example that the fifth joint assembly 262 may be drivingly connected to the first end portion 264 of the fourth propeller shaft 260 by using a crash collapse assembly according to an embodiment of the disclosure.

Additionally, as illustrated in FIG. 2 of the disclosure, a second end portion 270 of the fourth propeller shaft 260 is drivingly connected to an end of a sixth joint assembly 272. As a non-limiting example, the sixth joint assembly 272 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the sixth joint assembly 272 may be drivingly connected to the second end portion 270 of the fourth propeller shaft 260 by using a crash collapse assembly according to an embodiment of the disclosure.

Drivingly connected to an end of the sixth joint assembly 272, opposite the fourth propeller shaft 260 is an end of a rear tandem axle system input shaft 274. As a non-limiting example, the rear tandem axle input shaft 274 may be a rear tandem axle differential input shaft, a coupling shaft, stub shaft or a rear tandem axle differential pinion shaft. Drivingly connected to an end of the rear tandem axle input shaft 274, opposite the fourth propeller shaft 260, is the rear tandem axle differential 268. The rear tandem axle differential 268 is a set of gears that allows the outer drive wheel(s) of the wheeled vehicle to rotate at a faster rate that the inner drive wheel(s). The rotational power is transmitted through the rear tandem axle system 266 as described in more detail below.

The rear tandem axle system 266 further includes a first rear tandem axle half shaft 276 and a second rear tandem axle half shaft 278. The first rear tandem axle half shaft 276 extends substantially perpendicular to the rear tandem axle system input shaft 274. A first end portion 280 of the first rear tandem axle half shaft 276 is drivingly connected to a first rear tandem axle wheel assembly 282 and a second end portion 284 of the first rear tandem axle half shaft 276 is drivingly connected to an end of the rear tandem axle differential 268. As a non-limiting example, the second end portion 284 of the first rear tandem axle half shaft 276 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 274 is the second forward tandem axle half shaft 278. A first end portion 286 of the second rear tandem axle half shaft 278 is drivingly connected to a second rear tandem axle wheel assembly 288. A second end portion 290 of the second rear tandem axle half shaft 278 is drivingly connected to an end of the rear tandem axle differential 268 opposite the first rear tandem axle half shaft 276. As a non-limiting example, the second end portion 290 of the second rear tandem axle half shaft 278 is drivingly connected to a rear tandem axle differential side gear, a separate stub shaft, a separate coupling shaft, a second rear tandem axle differential output shaft and/or a shaft that is formed as part of a rear tandem axle differential side gear.

FIG. 3 is a schematic top-plan view of a vehicle 300 having one or more shaft assemblies according to an embodiment of the disclosure. The vehicle 300 has an engine 302, which is drivingly connected to a transmission 304. A transmission output shaft 306 is then drivingly connected to an end of the transmission 304 opposite the engine 302. The transmission 304 is a power management system, which provides controlled application of the rotational power generated by the engine 302 by means of a gearbox.

The transmission output shaft 306 is drivingly connected to a transfer case input shaft 308 which in turn is drivingly connected to a transfer case 310. The transfer case 310 is used to transfer the rotational power from the transmission 304 to a front axle system 312 and a rear axle system 314 by utilizing a series of gears and drive shafts. The transfer case 310 includes a first transfer case output 316 shaft and a second transfer case output shaft 318.

A first propeller shaft 320 extends from the first transfer case output shaft 316 to the front axle system 312 of the vehicle 300. A first end portion 322 of the first propeller shaft 320 is drivingly connected to an end of the first transfer case output shaft 316 opposite the transfer case 310 via a first joint assembly 324. As a non-limiting example, the first joint assembly 324 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the first joint assembly 324 may be drivingly connected to the first end portion 322 of the first propeller shaft 320 by using a crash collapse assembly according to an embodiment of the disclosure.

As illustrated in FIG. 3 of the disclosure, a second end portion 326 of the first propeller shaft 320 is drivingly connected to a second joint assembly 328. As a non-limiting example, the second joint assembly 328 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the second joint assembly 328 may be drivingly connected to the second end portion 326 of the first propeller shaft 320 by using a crash collapse assembly according to an embodiment of the disclosure.

Drivingly connected to an end of the second joint assembly 328 is an end of a front axle system input shaft 330. As a non-limiting example, the front axle system input shaft 330 may be a front axle differential input shaft, a coupling shaft, stub shaft or a front axle differential pinion shaft. Drivingly connected to an end of the front axle system input shaft 330, opposite the first propeller shaft 320, is a front axle differential 332. The front axle differential 332 is a set of gears that allows the outer drive wheel(s) of the wheeled vehicle to rotate at a faster rate that the inner drive wheel(s). The rotational power is transmitted through the front axle system 312 as described in more detail below.

The front axle system 312 further includes a first front axle half shaft 334 and a second front axle half shaft 336. The first front axle half shaft 334 extends substantially perpendicular to the front axle system input shaft 330. A first end portion 338 of the first front axle half shaft 334 is drivingly connected to a first front axle wheel assembly 340 and a second end portion 342 of the first front axle half shaft 334 is drivingly connected to an end of the front axle differential 332. As a non-limiting example, the second end portion 342 of the first front axle half shaft 334 is drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 330 is the second front axle half shaft 336. A first end portion 344 of the second front axle half shaft 336 is drivingly connected to a second front axle wheel assembly 346. A second end portion 348 of the second front axle half shaft 336 is drivingly connected to an end of the front axle differential 332 opposite the first front axle half shaft 334. As a non-limiting example, the second end portion 348 of the second front axle half shaft 336 is drivingly connected to a front axle differential side gear, a separate stub shaft, a separate coupling shaft, a second front axle differential output shaft and/or a shaft that is formed as part of a front axle differential side gear.

An end of the second transfer case output shaft 318 is drivingly connected to an end of the transfer case 310 opposite the transfer case input shaft 308. As illustrated in FIG. 3 of the disclosure, a first end portion 350 of a second propeller shaft 352 is drivingly connected to an end of the second transfer case output shaft 318 opposite the transfer case 310 via a third joint assembly 354. As non-limiting example, the third joint assembly 354 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the third joint assembly 354 may be drivingly connected to the first end portion 350 of a second propeller shaft 352 by using a crash collapse assembly according to an embodiment of the disclosure.

As illustrated in FIG. 3 of the disclosure, a second end portion 356 of the second propeller shaft 352 is drivingly connected to a fourth joint assembly 358. As a non-limiting example, the fourth joint assembly 358 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the fourth joint assembly 358 may be drivingly connected to the second end portion 356 of the second propeller shaft 352 by using a crash collapse assembly according to an embodiment of the disclosure.

Drivingly connected to an end of the fourth joint assembly 358, opposite the second propeller shaft 352, is a third propeller shaft 360. The third propeller shaft 360 drivingly connects the transfer case 310 to a rear differential 362 of the rear axle system 314. As illustrated in FIG. 3 of the disclosure, a first end portion 364 of the third propeller shaft 360 is drivingly connected to an end of the fourth joint assembly 358 opposite the second propeller shaft 352. It is within the scope of this disclosure and as a non-limiting example that the fourth joint assembly 358 may be drivingly connected to the first end portion 364 of the third propeller shaft 360 by using a crash collapse assembly according to an embodiment of the disclosure.

A second end portion 366 of the third propeller shaft 360 is drivingly connected to an end of a fifth joint assembly 368. As a non-limiting example, the fifth joint assembly 368 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the fifth joint assembly 368 may be drivingly connected to the second end portion 366 of the third propeller shaft 360 by using a crash collapse assembly according to an embodiment of the disclosure.

Drivingly connected to an end of the fifth joint assembly 368, opposite the third propeller shaft 360, is an end of a rear axle system'input shaft 370. An end of the rear axle system input shaft 370, opposite the third propeller shaft 360, is drivingly connected to the rear differential 362 of the rear axle system 314. As a non-limiting example, the rear axle system input shaft 370 may be a rear differential input shaft, a coupling shaft, stub shaft or a rear axle differential pinion shaft. The rear axle differential 362 is a set of gears that allows the outer drive wheel(s) of the wheeled vehicle to rotate at a faster rate that the inner drive wheel(s). The rotational power is transmitted through the rear axle system 314 as described in more detail below.

The rear axle system 314 further includes a first rear axle half shaft 372 and a second rear axle half shaft 374. The first rear axle half shaft 372 extends substantially perpendicular to the rear axle system input shaft 370. A first end portion 376 of the first rear axle half shaft 372 is drivingly connected to a first rear axle wheel assembly 378 and a second end portion 380 of the first rear axle half shaft 372 is drivingly connected to an end of the rear axle differential 362. As a non-limiting example, the second end portion 380 of the first rear axle half shaft 372 is drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 370 is the second rear axle half shaft 374. A first end portion 382 of the second rear axle half shaft 374 is drivingly connected to a second rear axle wheel assembly 384. A second end portion 386 of the second rear axle half shaft 374 is drivingly connected to an end of the rear axle differential 362 opposite the first rear axle half shaft 372. As a non-limiting example, the second end portion 386 of the second rear axle half shaft 374 is drivingly connected to a rear axle differential side gear, a separate stub shaft, a separate coupling shaft, a second rear axle differential output shaft and/or a shaft that is formed as part of a rear axle differential side gear.

Figure 4:
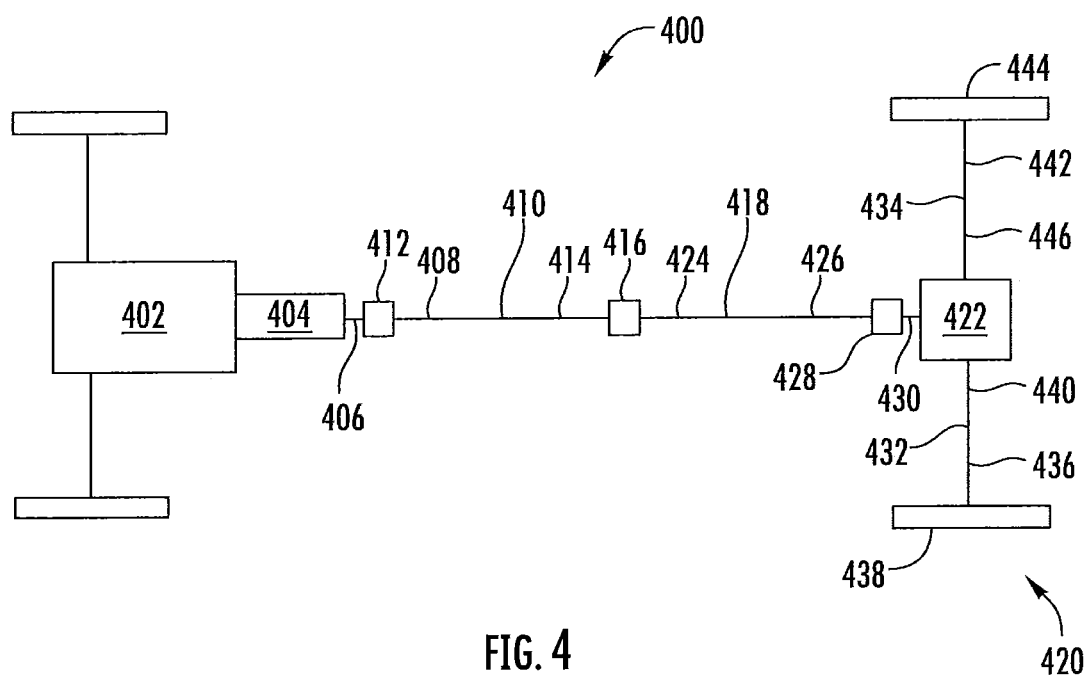
FIG. 4 is a schematic top-plan view of still yet another vehicle having one or more shaft assemblies according to an embodiment of the disclosure.

FIG. 4 is a schematic top-plan view of a vehicle 400 having one or more shaft assemblies according to an embodiment of the disclosure. The vehicle 400 has an engine 402, which is drivingly connected to a transmission 404. A transmission output shaft 406 is drivingly connected to an end of the transmission 404 opposite the engine 402. The transmission 404 is a power management system, which provides controlled application of the rotational power generated by the engine by means of a gear box.

A first end portion 408 of a first propeller shaft 410 is drivingly connected to an end of the transmission output shaft 406 opposite the transmission 404 via a first joint assembly 412. As a non-limiting example, the first joint assembly 412 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the first joint assembly 412 may be drivingly connected to the first end portion 408 of the first propeller shaft 410 by using a crash collapse assembly according to an embodiment of the disclosure.

As illustrated in FIG. 4 of the disclosure, a second end portion 414 of the first propeller shaft 410 is drivingly connected to a second joint assembly 416. As a non-limiting example, the second joint assembly 416 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the second joint assembly 416 may be drivingly connected to the second end portion 414 of the first propeller shaft 410 by using a crash collapse assembly according to an embodiment of the disclosure.

Drivingly connected to an end of the second joint assembly 416, opposite the first propeller shaft 410, is a second propeller shaft 418. The second propeller shaft 418 drivingly connects the transmission 404 to a rear axle system 420 having rear axle differential 424. As illustrated in FIG. 4 of the disclosure, a first end portion 424 of the second propeller shaft 418 is drivingly connected to an end of the second joint assembly 416 opposite the first propeller shaft 410. It is within the scope of this disclosure and as a non-limiting example that the second joint assembly 416 may be drivingly connected to the first end portion 424 of the second propeller shaft 418 by using a crash collapse assembly according to an embodiment of the disclosure.

A second end portion 426 of the second propeller shaft 418 is drivingly connected to an end of a third joint assembly 428. As a non-limiting example, the third joint assembly 428 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. It is within the scope of this disclosure and as a non-limiting example that the third joint assembly 428 may be drivingly connected to the second end portion 426 of the second propeller shaft 418 by using a crash collapse assembly according to an embodiment of the disclosure.

Drivingly connected to an end of the third joint assembly 426, opposite the second propeller shaft 418, is an end of a rear axle system input shaft 430. An end of the forward tandem axle system input shaft 430, opposite the second propeller shaft 418, is drivingly connected to the rear axle differential 422 of the rear axle system 420. As a non-limiting example, the rear axle system input shaft 430 may be a rear axle differential input shaft, a coupling shaft, stub shaft or a rear axle differential pinion shaft. The rear axle differential 422 is a set of gears that allows the outer drive wheel(s) of the wheeled vehicle to rotate at a faster rate that the inner drive wheel(s). The rotational power is transmitted through the rear axle system 420 as described in more detail below.

The rear axle system 420 further includes a first rear axle half shaft 432 and a second rear axle half shaft 434. The first rear axle half shaft 432 extends substantially perpendicular to the rear axle system input shaft 430. A first end portion 436 of the first rear axle half shaft 432 is drivingly connected to a first rear axle wheel assembly 438 and a second end portion 440 of the first rear axle half shaft 432 is drivingly connected to an end of the rear axle differential 422. As a non-limiting example, the second end portion 440 of the first rear axle half shaft 432 is drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 430 is the second rear axle half shaft 434. A first end portion 442 of the second rear axle half shaft 434 is drivingly connected to a second rear axle wheel assembly 444. A second end portion 446 of the second rear axle half shaft 434 is drivingly connected to an end of the rear axle differential 422 opposite the first rear axle half shaft 432. As a non-limiting example, the second end portion 446 of the second rear axle half shaft 434 is drivingly connected to a rear axle differential side gear, a separate stub shaft, a separate coupling shaft, a second rear axle differential output shaft and/or a shaft that is formed as part of a rear axle differential side gear.

Figure 5:
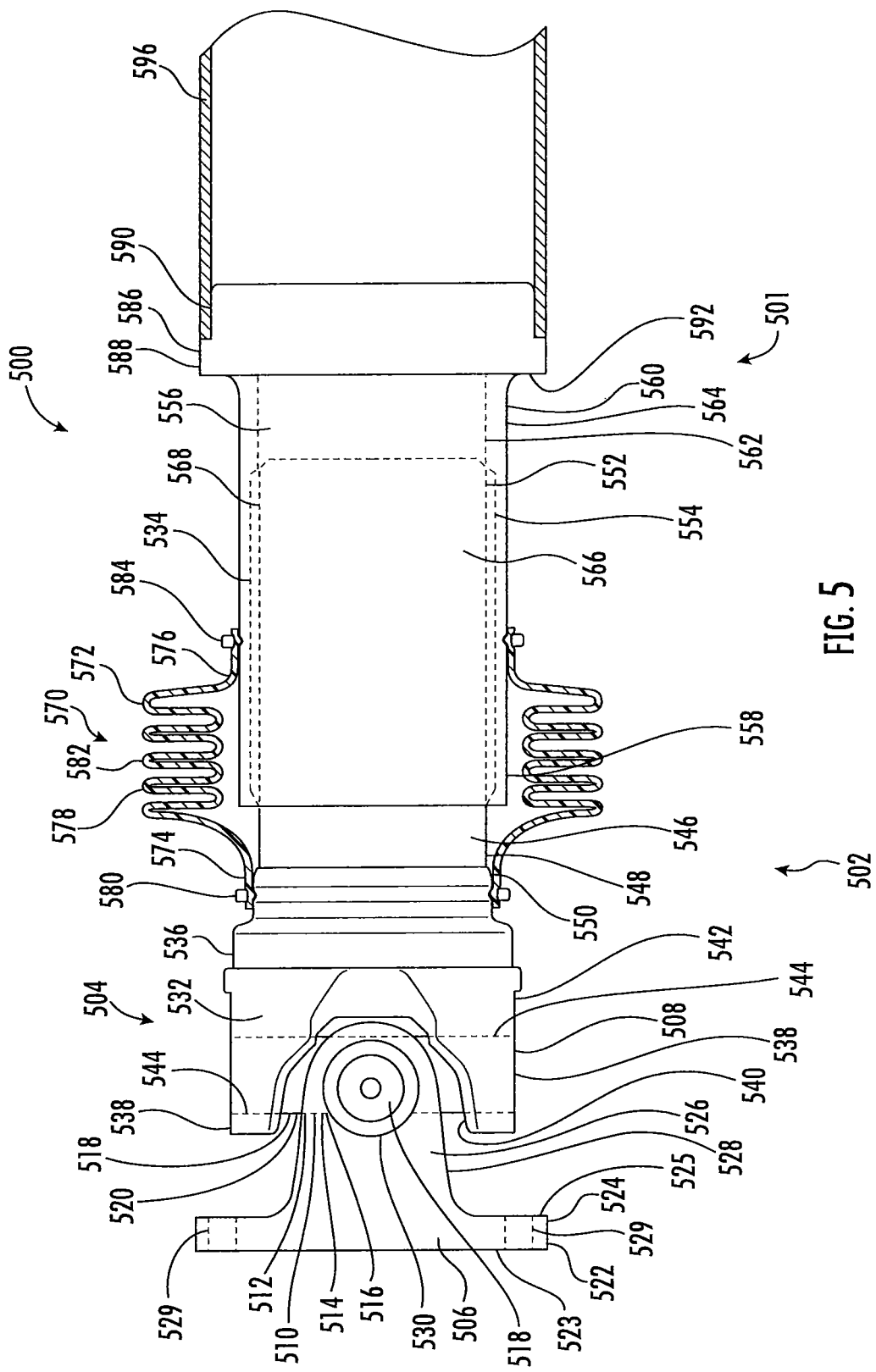
FIG. 5 is a partial cut-away schematic side-view of a shaft assembly having a crash'collapse assembly according to an embodiment of the disclosure when the shaft assembly is in a first position.

FIGS. 5-9 provide a schematic side-view of a shaft assembly 500 having a crash collapse assembly 501 according to an embodiment of the disclosure. When the shaft assembly 500 is in the position illustrated in FIG. 5, the shaft assembly 500 is in a first position 502. As best seen in FIG. 5 of the disclosure, the shaft assembly 500 includes a joint assembly 504 having a first joint member 506, a second joint member 508 and one or more third joint members 510 drivingly connecting the first joint member 506 to the second joint member 508 of the joint assembly 504. It is within the scope of this disclosure and as a non-limiting example that the joint assembly 504 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

As best seen in FIG. 5 of the disclosure and as a non-limiting example, the one or more third joint members 510 may include a plurality of trunnions 512 extending outward from at least a portion of an outer surface 514 of a central body portion 516 of the one or more third joint members 510. According to an embodiment of the disclosure and as a non-limiting example, the plurality of trunnions 512 extending from the outer surface 514 of the central body portion 516 of the one or more third joint members 510 may be disposed equidistant from each other along the outer surface 514 of the central body portion 516. It is within the scope of this disclosure and as a non-limiting example that the one or more third joint members 510 may be a journal cross.

Rotatively connected to at least a portion of the outer surface 514 of each of the plurality of trunnions 512 of the third joint member 510 is a bearing cap assembly 518. It is within the scope of this disclosure and as a non-limiting example that the bearing cap assembly 518 includes a bearing cap 520 which houses a plurality of bearings (not shown) that are disposed along an inner surface (not shown) of the bearing cap 520. The bearing cap assembly 518 provides a rotational connection between the one or more third joint members 510 and the first and second joint members 506 and 508 of the joint assembly 504 thereby reducing the amount of friction between the first, second and third joint members 506, 508 and 510 when in operation.

As best seen in FIG. 5 of the disclosure, the first joint member 506 has a first end portion 522, a first end 523, a second end portion 524 and a second end 525. Extending outward from at least a portion of the second end portion 524 of the first joint member 506 is one or more axially extending arms 526 having an inner surface (not shown) and an outer surface 528. One or more openings 530 extend from an inner surface (not shown) to an outer surface 528 of the one or more axially extending arms 526 of the first joint member 506 of the joint assembly 504. The one or more openings 530 in the one or more axially extending arms 526 are of a size and shape to receive and/or retain at least a portion of the bearing cap assembly 518 connected to the outer surface 514 of the plurality of trunnions 512. As a non-limiting example, the bearing cap assembly 518 may be retained within the one or more openings 530 in the one or more axially extending arms 526 of the first joint member 506 by using one or more welds, one or more adhesives, one or more mechanical fasteners and/or a threaded connection. It is within the scope of this disclosure and as a non-limiting example that the first joint member 506 of the joint assembly 504 may be a flange yoke.

The first joint member 506 may further include one or more mechanical fastener openings 529. As best seen in FIG. 5 of the disclosure, the one or more mechanical fastener openings 529 extend from the first end 523 to the second end 525 of the first joint member 506 of the joint assembly 504. As a non-limiting example that the one or more mechanical fastener openings 529 in the first joint member 506 are of a size and shape to receive and/or retain one or more mechanical fasteners (not shown).

In accordance with the embodiment of the disclosure illustrated in FIG. 5, the second joint member 508 has a first end portion 532, a second end portion 534 and an intermediate portion 536 interposed between the first and second end portion 532 and 534 of the second joint member 508. One or more axially extending arms 538 having an inner surface 540 and an outer surface 542 extend outboard from at least a portion of the intermediate portion 536 of the second joint member 508, toward the first joint member 506. Extending from the inner surface 540 to the outer surface 542 of the one or more axially extending arms 538 of the second joint member 508 is one or more openings 544. The one or more openings 544 in the one or more axially extending arms 538 of the second joint member 508 are of a size and a shape to receive and/or retain at least a portion of the bearing cap assembly 518 connected to the outer surface 514 of the plurality of trunnions 512 of the one or more third joint members 510. As a non-limiting example, the bearing cap assembly 518 may be retained within the one or more openings 544 in the one or more axially extending arms 538 of the second joint member 508 by using one or more welds, one or more adhesives, one or more mechanical fasteners and/or a threaded connection. It is within the scope of this disclosure and as a non-limiting example that the second joint member may be made of an aluminium alloy, iron, an iron alloy, a steel alloy, a stainless steel alloy or a composite material. Additionally, it is within the scope of this disclosure and as a non-limiting example that the second joint member 508 may be a slip yoke.

Extending outboard from at least a portion of the intermediate portion 536 of the second joint member 508, away from the first joint member 506, is a substantially cylindrical body portion 546 having an outer surface 548, a first end portion 550 and a second end portion 552. As best seen in FIG. 5 of the disclosure and as a non-limiting example the substantially cylindrical body portion 546 of the second joint member 508 has a diameter D1 that is less than or equal to an outermost diameter OD1 of the second joint member 508 of the joint assembly 504. Circumferentially extending along at least a portion of the outer surface 548 of the substantially cylindrical body portion 546 of the second joint member 508 is a plurality of axially extending body portion splines 554.

Drivingly connected to at least a portion of the substantially cylindrical body portion 546 of the second joint member 508 is a first shaft 556 of a having a first end portion 558, a second end portion 560, an inner surface 562 and an outer surface 564. The inner surface 562 and the outer surface 564 of the first shaft 556 defines a hollow portion 566 therein. As illustrated in FIG. 5 of the disclosure, the hollow portion 566 of the first shaft 556 is of a size and a shape to receive and/or retain at least a portion of the substantially cylindrical body portion 546 of the second joint member 508 of the joint assembly 504. Additionally, as illustrated in FIG. 5 of the disclosure, the first shaft 556 of the crash collapse assembly 501 extends co-axially with the substantially cylindrical body portion 546 of the second joint member 508. It is within the scope of this disclosure and as a non-limiting example that the first shaft may be made of an aluminum alloy, iron, an iron alloy, a steel alloy, a stainless steel alloy or a composite material.

Circumferentially extending along at least a portion of the inner surface 562 of the first shaft 556 is a plurality of axially extending first shaft splines 568. The plurality of axially extending first shaft splines 568 are complementary to and meshingly engaged with the plurality of axially extending body portion splines 554 on the outer surface 548 of the substantially cylindrical body portion 546 of the second joint member 508.

A boot assembly 570 is disposed radially outboard from at least a portion of the second joint member 508 and the first shaft 556 of the crash collapse assembly 501. As best seen in FIG. 5 of the disclosure, the boot assembly 570 includes a flexible boot 572 having a first end portion 574, a second end portion 576 and an intermediate portion 578 interposed between the first and second end portions 574 and 576 of the flexible boot 572. The flexible boot 572 provides a flexible seal for the shaft assembly 500 preventing the migration of dust, debris and/or moisture from the external environment into the splining engagement between the substantially cylindrical body portion 546 of the second joint member 508 and the first shaft 556 of the crash collapse assembly 501. As a non-limiting example, the flexible boot 572 is made of a polymeric material, a rubber material, an elastomeric material, a thermoplastic material or a combination thereof.

At least a portion of the first end portion 574 of the flexibly boot 572 is connected to at least a portion of the outer surface 548 of the substantially cylindrical body portion 546 of the second joint member 508. In accordance with the embodiment of the disclosure illustrated in FIG. 5 and as a non-limiting example, at least a portion of the first end portion 574 of the flexible boot 572 is connected to at least a portion of the substantially cylindrical body portion 546 of the second joint member 508 by using a first boot retention member 580. As a non-limiting example, the first retention member 580 of the flexible boot assembly 570 is a boot clamp.

In accordance with the embodiment of the disclosure illustrated in FIG. 5 of the disclosure and as a non-limiting example, the intermediate portion 578 of the flexible boot 572 has a plurality of convolutions 582. The plurality of convolutions 582 of the flexible boot 572 allows the substantially cylindrical body portion 546 of the second joint member 508 to translate axially a pre-determined amount of distance relative to the first shaft 556 while still providing a sealing engagement between the substantially cylindrical body portion 546 and the first shaft 556.

At least a portion of the second end portion 576 of the flexible boot 572 is connected to at least a portion of the outer surface 564 of the first shaft 556 of the crash collapse assembly 501. According to an embodiment of the disclosure and as a non-limiting example, the second end portion 576 of the flexible boot 572 may be connected to the outer surface 564 of the first shaft 556 of the crash collapse assembly 501 by using a second boot retention member 584. As a non-limiting example, the second boot retention member 584 is a boot clamp.

Circumferentially extending from at least a portion of the second end portion 560 of the first shaft 556 is an increased diameter portion 586 having a first end portion 588 and a second end portion 590. In accordance with an embodiment of the disclosure and as a non-limiting example, the increased diameter portion 586 of the first shaft 556 may be substantially cylindrical in shape. It is within the scope of this disclosure, that the increased diameter portion 586 may be a separate component that is integrally connected to at least a portion of the second end portion 560 of the first shaft 556 by using one or more adhesives, one or more mechanical fasteners, one or more welds and/or a threaded connection.

Figure 6:
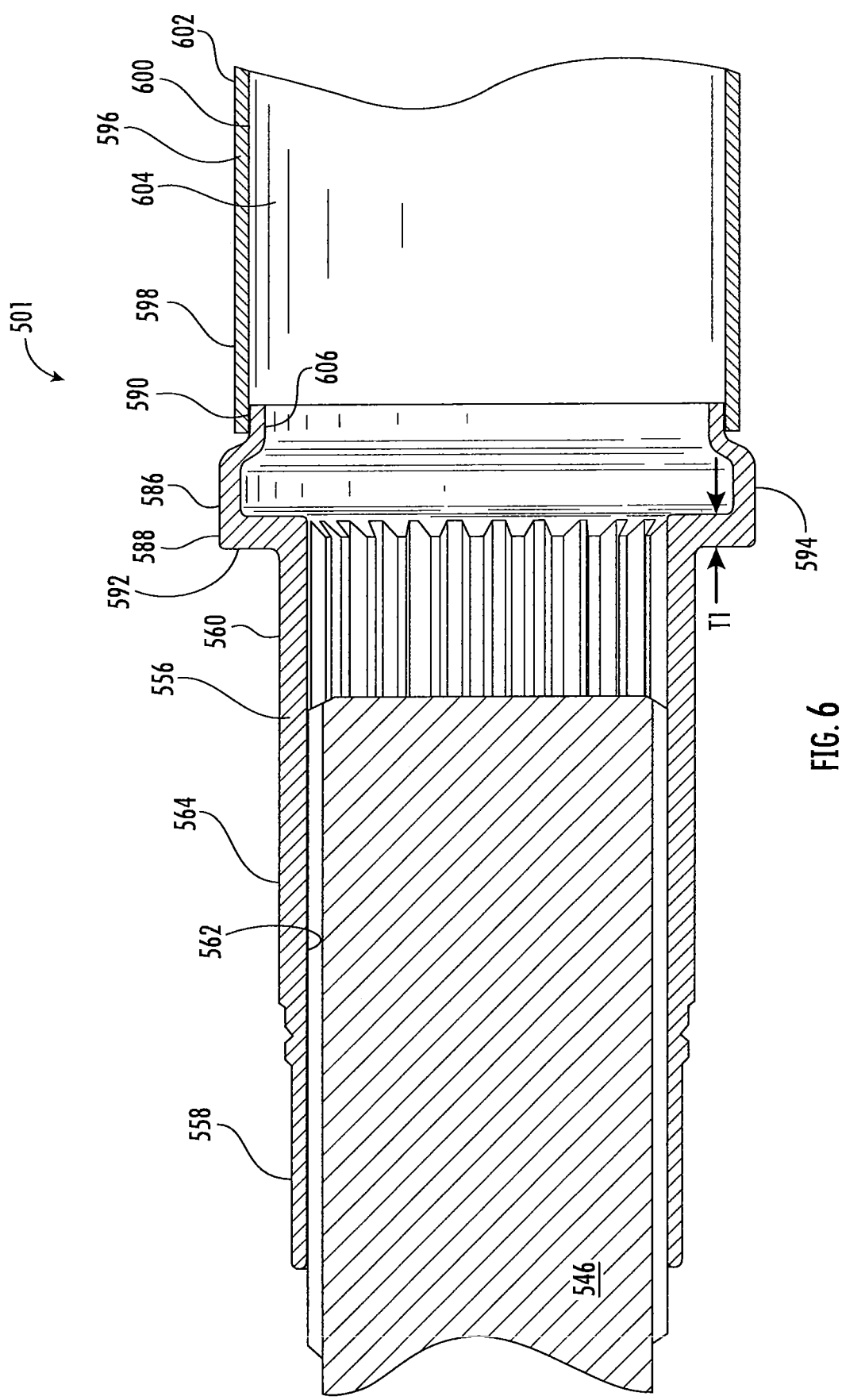
FIG. 6 is a cut-away schematic side-view of a portion of the crash collapse assembly illustrated in FIG. 5 when the crash collapse assembly is in the first position illustrated in FIG. 5 of the disclosure.

As best seen in FIG. 6 of the disclosure, a wall portion 592 extends from the outer surface 564 of the second end portion 560 of the first shaft 556 to an outermost surface 594 of the increased diameter portion 586 of the first shaft 556 of the crash collapse assembly 501. The wall portion 592 of the increased diameter portion 586 of the first shaft 556 has a thickness T1 capable of transmitting the rotational power of an engine (not shown) from one component of the shaft assembly 500 to another, but is thin enough to allow the crash collapse assembly 501 to collapse upon application of a pre-determined amount of force onto the wall portion 592. It is within the scope of this disclosure and as a non-limiting example, that the thickness T1 of the wall portion 592 may be from approximately 1 mm to approximately 4 mm. In accordance with the embodiment of the disclosure illustrated in FIG. 6 and as a non-limiting example, the wall portion 592 may be substantially disk shaped. While the wall portion 592 illustrated in FIG. 6 is substantially disk shaped, it is within the scope of this disclosure and as a non-limiting example that the wall portion 592 may take any shape to achieve the desired performance of the crash collapse assembly 501 of the shaft assembly 500.

Extending co-axially with the first shaft 556 and the second joint member 508 is a second shaft 596 having a first end portion 598, a second end portion (not shown), an inner surface 600 and an outer surface 602. The inner surface 600 and the outer surface 602 defines a hollow portion 604 therein. It is within the scope of this disclosure and as a non-limiting example that the second shaft 596 may be a propeller shaft, a prop shaft, a drive shaft, a driving shaft or any other type of shaft used to transfer rotational power from one component to another over a relatively large distance. Additionally, it is within the scope of this disclosure and as a non-limiting example that the second shaft 596 may be made of an aluminum alloy, iron, an iron alloy, a steel alloy, a stainless steel alloy or a composite material.

According to an embodiment of the disclosure and as a non-limiting example, at least a portion of the first end portion 598 of the second shaft 596 is integrally connected to at least a portion of the increased diameter portion 586 of the first shaft 556 of the crash collapse assembly 501. In accordance with the embodiment illustrated in FIG. 6 and as a non-limiting example, at least a portion of the first end portion 598 of the second shaft 596 is received and/or retained within a reduced diameter portion 606 circumferentially extending along at least a portion of the outer surface 564 of the second end portion 690 of the increased diameter portion 586 of the first shaft 556. It is within the scope of this disclosure and as a non-limiting example that the first end portion 598 of the second shaft 596 may be integrally connected to at least a portion of the increased diameter portion 586 of the first shaft 556 by using one or more adhesives, one or more mechanical fasteners, one or more welds, a spline connection and/or a threaded connection.

Figure 7:
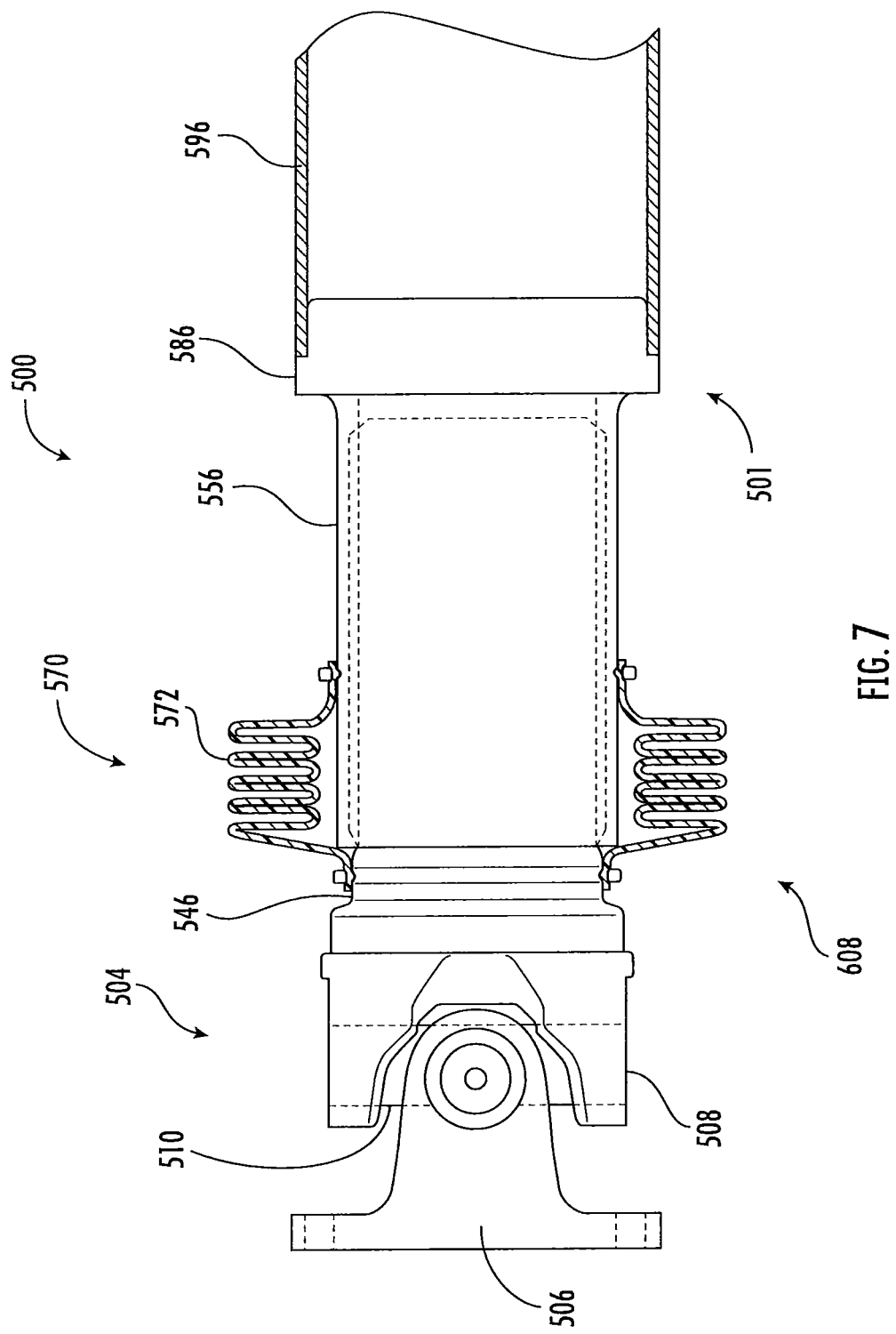
FIG. 7 is a partial cut-away schematic side-view of the shaft assembly illustrated in FIG. 5 when the shaft assembly has experienced a crash condition.

As illustrated in FIG. 7 of the disclosure and as a non-limiting example, when the shaft assembly 500 has experienced a crash condition 608. When the vehicle (not shown) experiences the crash condition 608 illustrated in FIG. 7 of the disclosure, the substantially cylindrical body portion 546 of the second joint member 508 is translated axially within the hollow portion 566 of the first shaft 556 toward the increased diameter portion 586 of the first shaft 556. According to an embodiment of the disclosure and as a non-limiting example, thy substantially cylindrical body portion 546 of the second joint member 508 will be allowed to translate axially within the first shaft 556 until at least a portion of the first end portion 558 of the first shaft 556 comes into direct contact with at least a portion of the intermediate portion 536 of the second joint member 508. In accordance with an alternative embodiment of the disclosure and as a non-limiting example, the substantially cylindrical body portion 546 of the second joint member 508 will be allowed to translate axially within the first shaft 556 until at least a portion of the first end portion 558 of the first shaft 556 comes into direct contact with an increased diameter portion (not shown) circumferentially extending from at least a portion of the first end portion 550 of the substantially cylindrical body portion 546 of the second joint member 508.

Figure 8:
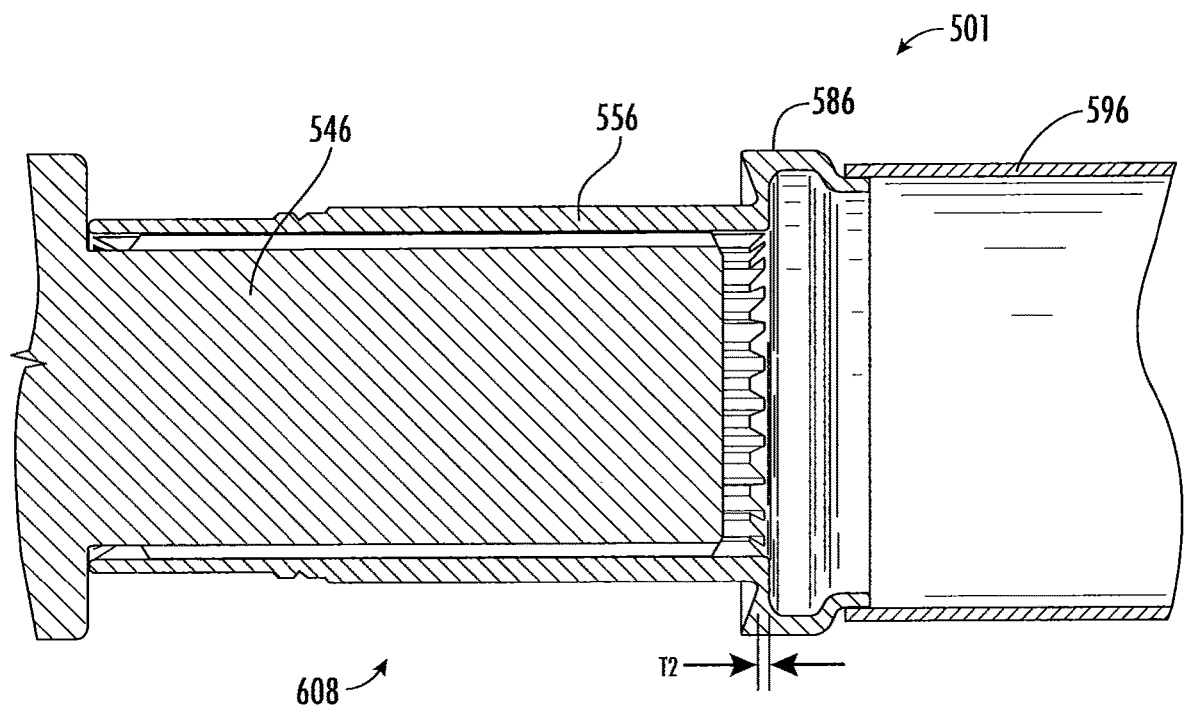
FIG. 8 is a cut-away schematic side-view of the portion of the shaft assembly illustrated in FIG. 6 when the shaft assembly has experienced the crash condition illustrated in FIG. 7 of the disclosure.

Once the first shaft 556 has come into direct contact with the second joint member 508, an amount of force is applied to the wall portion 592 of the increased diameter portion 586 of the first shaft 556 by the second shaft 596, the second joint member 508 and/or the first shaft 556 of the shaft assembly 500. As illustrated in FIG. 8 of the disclosure, when the amount of force applied to the wall portion 592 of the increased diameter portion 586 of the first shaft 556 reaches a pre-determined amount, the wall portion 592 will begin to cave in. If the amount of force experienced by the shaft assembly 500 is enough to cause the material of the wall portion 592 to plastically deform, the material of the wall portion 592 will experience necking. As best seen in FIG. 8 of the disclosure, when the material of the wall portion 592 experiences necking, the thickness T2 of the wall portion 592 will decrease.

Figure 9:
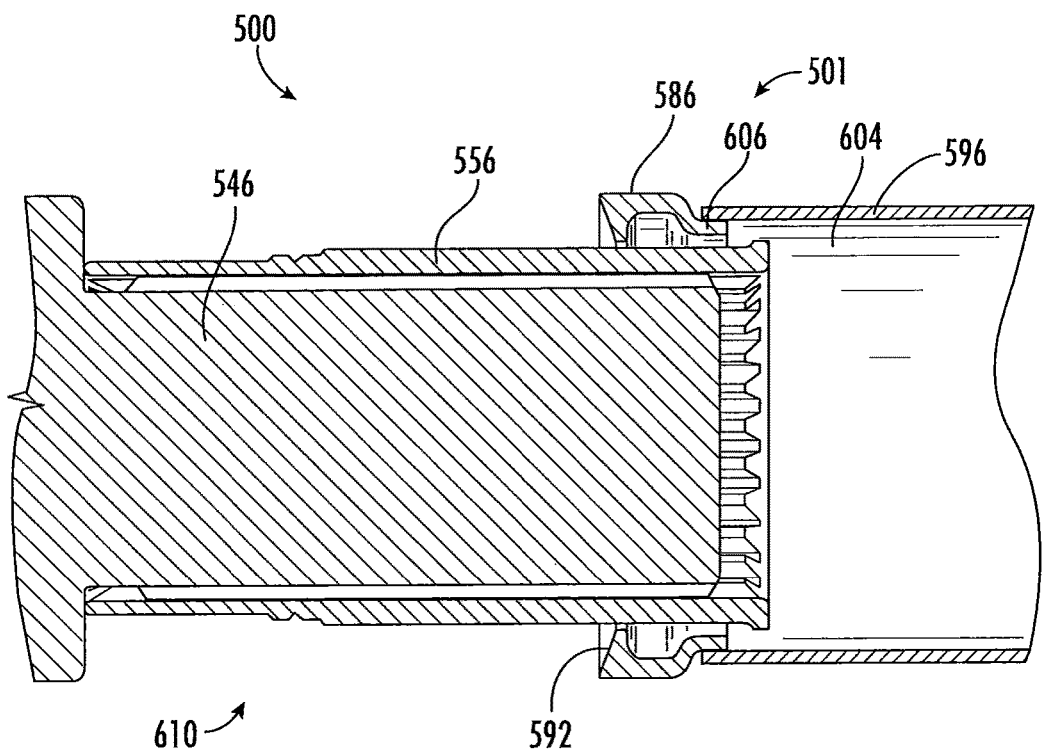
FIG. 9 is a cut-away schematic side-view of the portion of the crash collapse assembly illustrated in FIGS. 5-8 when the crash collapse assembly is in a second position.
Figure 12:
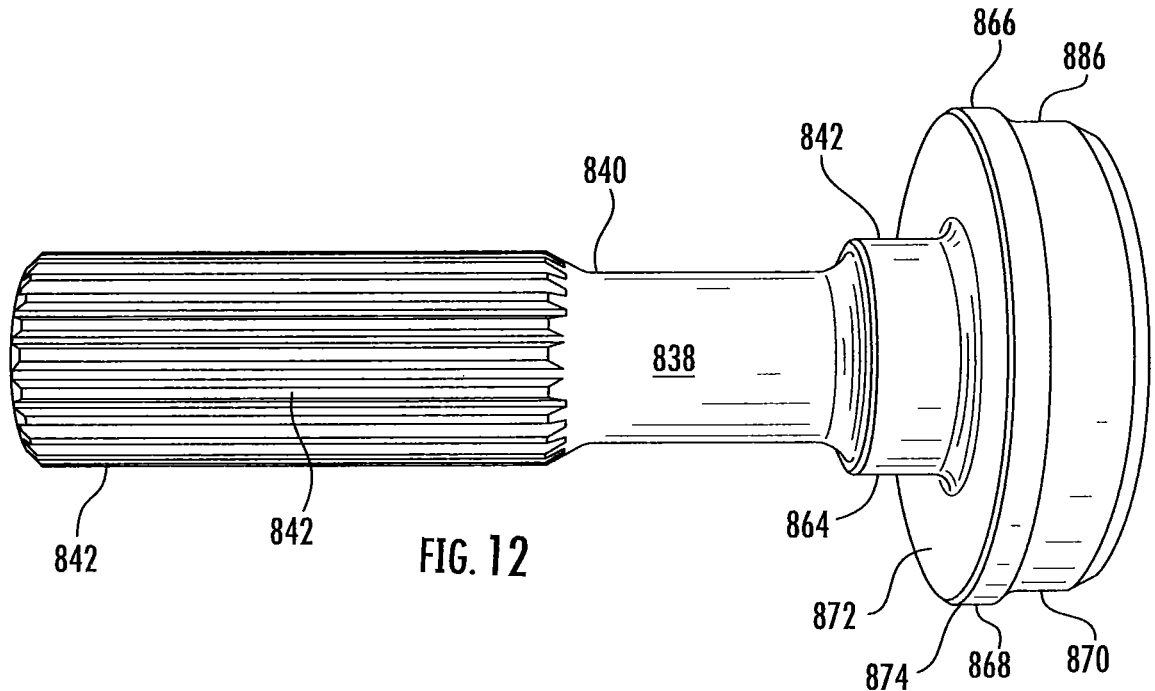
FIG. 12 is a schematic perspective view of a portion of the shaft assembly illustrated in FIG. 11.

When the shaft assembly 500 is in a second position 610 illustrated in FIG. 9 of the disclosure, at least a portion of the first shaft 556 has separated from the increased diameter portion 586 of the first shaft 556 thereby allowing the crash collapse assembly 501 to collapse. In accordance with the embodiment of the disclosure illustrated in FIG. 9, when the amount of force applied to the wall portion 592 reaches a pre-determined amount, the material of the wall portion 592 will fracture and separate the first shaft 556 from the increased diameter portion 586 of the first shaft 556. As a result, at least a portion of the first shaft 556, the first joint member 506, the second joint member 508, the one or more third joint members 510 and/or the flexible boot assembly 570 may translate axially into the hollow portion 604 of the second shaft 596 of the shaft assembly 500. It is within the scope of this disclosure, that the amount of force needed to fracture the material of the wall portion 592 of the increased diameter portion 586 of the first shaft 556 is greater than the amount of force exerted onto the shaft assembly 500 when the vehicle (not shown) is in normal operation. This will allow the shaft assembly 500 to operate normally until the vehicle (not shown) experiences the crash condition 608.

According to an embodiment of the disclosure and as a non-limiting example, the amount of force needed to fracture the material of the wall portion 592 of the increased diameter portion 586 of the first shaft 556 is from approximately 13 kN to approximately 75 kN. In accordance with an alternative embodiment of the disclosure and as a non-limiting example, the amount of force needed to fracture the material of the wall portion 592 of the increased diameter portion 586 of the first shaft 556 is from approximately 60 kN to approximately 75 kN. It is to be understood, that the amount of force needed to fracture the wall portion 592 from the first shaft 556 can be altered by changing the material composition of the first shaft 556, the material composition of the wall portion 592, the material composition of the increased diameter portion 586, the thickness T1 of the wall portion 592, the shape of the wall portion 586 and/or the ultimate tensile strength of the material of the wall portion 592 used. As a result, the crash collapse assembly 501 described herein is customizable and able to be used in a wide array of applications.

In accordance with an embodiment of the disclosure (not shown), the wall portion 592 may further include one or more crash collapse features (not shown). According to an embodiment of the disclosure and as a non-limiting example, the one or more crash collapse features (not shown) may include one or more notched portions (not shown) and/or one or more cut-back portions (not shown) that extend along at least a portion of the inner surface 562 and/or the outer surface 564 of the wall portion 592. The one or more notched portions (not shown) and/or the one or more cut-back portions (not shown) provide the wall portion 592 with a variable thickness. It is to be understood that the one or more notched portions (not shown) and/or one or more cut-back portions (not show), may be used in order to ensure that the wall portion 592 of the increased dimeter portion 586 fractures at a pre-determined location and upon the application of a pre-determined amount of force. As a result, the amount of force needed to fracture the wall portion 592 from the first shaft 556 can be customized by altering the cross-sectional shape of the one or more notched portions (not shown), altering the cross-sectional shape of the one or more cut-back portions (not shown), the location(s) of the one or more notched portions (not shown), the locations(s) of the one or more cut-back portions (not shown), the thickness of the wall portion 592 at the thinnest point of the one or more notched portions (not shown) and/or the thickness of the wall portion 592 at the thinnest point of the one or more cut-back portions (not shown). It is within the scope of this disclosure and as a non-limiting example, that the notched portion (not shown) and/or the cut-back portion (not shown) may have a substantially V-shaped cross-sectional shape.

FIG. 10 is a cut-away schematic side-view of a portion of a crash collapse assembly 700 of a shaft assembly 701 according to an alternative embodiment of the disclosure. The crash collapse assembly 700 illustrated in FIG. 10 of the disclosure is the same as the crash collapse assembly 501, except where specifically noted below. As illustrated in FIG. 10 of the disclosure, the crash collapse assembly 700 includes a first shaft 702 having a first end portion 704, a second endportion 706, an inner surface 708 and an outer surface 710. The inner surface 708 and the outer surface 710 of the first shaft 702 defines a hollow portion 712 therein. As illustrated in FIG. 10 of the disclosure, the first shaft 702 extends co-axially with the second joint member 508 of the shaft assembly 701. It is within the scope of this disclosure and as a non-limiting example that the first shaft 702 may be made of an aluminium alloy, iron, an iron alloy, a steel alloy, a stainless steel alloy or a composite material.

Circumferentially extending along at least a portion of the inner surface 708 of the first shaft 702 is a plurality of axially extending first shaft splines 714. The plurality of axially extending first shaft splines 714 are complementary to and meshingly engaged with the plurality of axially extending body portion splines 554 on the outer surface 548 of the substantially cylindrical body portion 546 of the second joint member 508.

As illustrated in FIG. 10 of the disclosure, an increased diameter portion 716 circumferentially extends from at least a portion of the outer surface 712 of the second end portion 706 of the first shaft 702. In accordance with an embodiment of the disclosure and as a non-limiting example, the increased diameter portion 716 of the first shaft 702 may be substantially cylindrical shape. It is within the scope of this disclosure, that the increased diameter portion 716 may be a separate component that is integrally connected to at least a portion of the second end portion 706 of the first shaft 702 by using one or more adhesives, one or more mechanical fasteners, one or more welds and/or a threaded connection.

In accordance with the embodiment of the disclosure illustrated in FIG. 10, a wall portion 718 extends from the outer surface 712 of the second end portion 706 of the first shaft 702 to an outermost surface 720 of the increased diameter portion 716 of the first shaft 702. The wall portion 718 of the increased diameter portion 716 of the first shaft 702 has a thickness T3 that is capable of transmitting the rotational power of an engine (not shown) from one component of the shaft assembly 701 to another, but is thin enough to allow the crash collapse assembly 700 to collapse upon application of a pre-determined amount of force onto the wall portion 718. As illustrated in FIG. 10 of the disclosure and as a non-limiting example, the wall portion 718 of the increased diameter portion 716 of the first shaft 702 may be substantially disk shaped. While the wall portion 718 illustrated in FIG. 10 is substantially disk shaped, it is within the scope of this disclosure and as a non-limiting example that the wall portion 718 may take any shape to achieve the desired performance of the crash collapse assembly 700 of the shaft assembly 701. It is within the scope of this disclosure and as a non-limiting example, that the thickness T3 of the wall portion 718 may be from approximately 1 mm to approximately 4 mm.

According to an embodiment of the disclosure (not shown), the wall portion 718 may further include one or more crash collapse features (not shown). According to an embodiment of the disclosure and as a non-limiting example, the one or more crash collapse features (not shown) may include one or more notched portions (not shown) and/or one or more cut-back portions (not shown) extending along at least a portion of the inner surface 708 and/or the outer surface 710 of the wall portion 718 of the increased diameter portion 716 of the first shaft 702. The one or more notched portions (not shown) and/or the one or more cut-back portions (not shown) provide the wall portion 718 with a variable thickness. It is to be understood that the one or more notched portions (not show) and/or the one or more cut-back portions (not shown), may be used in order to ensure that the wall portion 718 of the increased dimeter portion 716 of the first shaft 702 fractures at a pre-determined location and upon the application of a pre-determined amount of force. As a result, the amount of force needed to fracture the wall portion 718 from the first shaft 702 can be customized by altering the cross-sectional shape of the one or more notched portions (not shown), altering the cross-sectional shape of the one or more cut-back portions (not shown), the location(s) of the one or more notched portions (not shown), the locations(s) of the one or more cut-back portions (not shown), the thickness of the wall portion 718 at the thinnest point of the one or more notched portions (not shown) and/or the thickness of the wall portion 718 at the thinnest point of the one or more cut-back portions (not shown). It is within the scope of this disclosure and as a non-limiting example, that the one or more notched portions (not shown) and/or the one or more cut-back portions (not shown) may have a substantially V-shaped cross-sectional shape.

Circumferentially extending along at least a portion of the inner surface 708 of the increased diameter portion 716 of the first shaft 702 is a receiving portion 722. The receiving portion 722 in the inner surface 708 of the increased diameter portion 716 of the first shaft 702 is of a size and shape to receive and/or retain at least a portion of the first end portion 598 of the second shaft 596 of the shaft assembly 701. As best seen in FIG. 10 of the disclosure and as a non-limiting example, the receiving portion 722 in the inner surface 708 of the increased diameter portion 716 has a diameter D2 that is greater than an inner diameter ID1 of the increased diameter portion 716 of the first shaft 702. It is within the scope of this disclosure and as a non-limiting example that the innermost diameter ID1 of the increased diameter portion 716 of the first shaft 702 may be substantially equal to or greater than an outermost diameter of the first shaft 702, the first joint member 506, the second joint member 508, the one or more third joint members 510 and/or the flexible boot assembly 570. This will allow at least a portion of the first shaft 702, the first joint member 506, the second joint member 508, the one or more third joint members 510 and/or the flexible boot assembly 570 to translate axially within at least a portion of the hollow portion 604 of the second shaft 596 upon the occurrence of a crash condition. Additionally, it is within the scope of this disclosure and as a non-limiting example that the first end portion 598 of the second shaft 596 may be integrally connected to at least a portion of the increased diameter portion 716 of the first shaft 702 by using one or more adhesives, one or more mechanical fasteners, one or more welds and/or a threaded connection.

FIGS. 11-14 provide a schematic side-view of a shaft assembly 800 having a crash collapse assembly 802 according to another embodiment of the disclosure when the shaft assembly 800 having a first position 804 when in normal operation. The shaft assembly 800 illustrated in FIGS. 11-14 is the same as the shaft assemblies 500 and 700 illustrated in FIGS. 5-10, except where specifically noted below. As best seen in FIG. 11 of the disclosure and as a non-limiting example, the shaft assembly 800 may include a joint assembly 806. It is within the scope of this disclosure and as a non-limiting example that the joint assembly 806 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

As best seen in FIG. 11 of the disclosure, the shaft assembly 800 includes a joint assembly 806 having a second joint member 808. At least a portion of the second joint member 808 is drivingly connected to at least a portion of the first joint member 506 by the one or more third joint members 510 of the joint assembly 806. The second joint member 808 has a first end portion 810, a second end portion 812 and an intermediate portion 814 interposed between the first and second end portion 812 and 814 of the second joint member 808. It is within the scope of this disclosure and as a non-limiting example that the second joint member 808 may be made of an aluminum alloy, iron, an iron alloy, a steel alloy, a stainless steel alloy or a composite material.

One or more axially extending arms 816 having an inner surface 818 and an outer surface 820 extend outboard from at least a portion of the intermediate portion 814 of the second joint member 808, toward the first joint member 506. Extending from the inner surface 818 to the outer surface 820 of the one or more axially extending arms 816 of the second joint member 808 is one or more openings 822. The one or more openings 822 in the one or more axially extending arms 816 of the second joint member 808 are of a size and a shape to receive and/or retain at least a portion of the bearing cap assembly 518 connected to the outer surface 514 of the plurality of trunnions 512 of the one or more third joint members 510. As a non-limiting example, the bearing cap assembly 518 may be retained within the one or more openings 822 in the one or more axially extending arms 816 of the second joint member 808 by using one or more welds, one or more adhesives, one or more mechanical fasteners and/or a threaded connection. It is within the scope of this disclosure and as a non-limiting example that the second joint member 808 may be a slip yoke.

Extending outboard from at least a portion of the intermediate portion 814 of the second joint member 808, away from the first joint member 506, is a substantially cylindrical body portion 824 having an inner surface 826, an outer surface 828, a first end portion 830 and a second end portion 832. The inner surface 826 and the outer surface 828 of the substantially cylindrical body portion 824 of the second joint member 808 defines a hollow portion 834 therein. Circumferentially extending along at least a portion of the inner surface 826 of the substantially cylindrical body portion 824 of the second joint member 808 is a plurality of axially extending body portion splines 836.

Extending co-axially with and drivingly connected to the second joint member 808 is a first shaft 838 having an outer surface 840, a first end portion 842 and a second end portion 844. Circumferentially extending along at least a portion of the outer surface 840 of the first shaft 838 is a plurality of axially extending first shaft splines 846. The plurality of axially extending first shaft splines 846 are complementary to and meshingly engaged with the plurality of axially extending body portion splines 836 on the inner surface 826 of the substantially cylindrical body portion 824 of the second joint member 808. It is within the scope of this disclosure and as a non-limiting example that the first shaft 838 may be made of an aluminum alloy, iron, an iron alloy, a steel alloy, a stainless steel alloy or a composite material.

A boot assembly 848 is disposed radially outboard from at least a portion of the second joint member 808 and the first shaft 838 of the crash collapse assembly 802. As best seen in FIG. 11 of the disclosure, the boot 848 assembly includes a flexible boot 850 having a first end portion 852, a second end portion 854 and an intermediate portion 856 interposed between the first and second end portions 852 and 854 of the flexible boot 848. The flexible boot 850 provides a flexible seal for the shaft assembly 800 preventing the migration of dust, debris and/or moisture from the external environment into the splining engagement between the substantially cylindrical body portion 824 of the second joint member 808 and the first shaft 838 of the crash collapse assembly 802. As a non-limiting example, the flexible boot 850 is made of a polymeric material, a rubber material, an elastomeric material, a thermoplastic material or a combination thereof.

At least a portion of the first end portion 852 of the flexibly boot 850 is connected to at least a portion of the outer surface 828 of the substantially cylindrical body portion 824 of the second joint member 808. In accordance with the embodiment of the disclosure illustrated in FIG. 11 and as a non-limiting example, at least a portion of the first end portion 852 of the flexible boot 850 is connected to at least a portion of the substantially cylindrical body portion 824 of the second joint member 808 by using a first boot retention member 858. As a non-limiting example, the first retention member 858 of the flexible boot assembly 850 is a boot clamp.

In accordance with the embodiment of the disclosure illustrated in FIG. 11 of the disclosure and as a non-limiting example, the intermediate portion 856 of the flexible boot 850 has a plurality of convolutions 860. The plurality of convolutions 860 of the flexible boot 850 allows the substantially cylindrical body portion 824 of the second joint member 808 to translate axially a pre-determined amount of distance relative to the first shaft 838 while still providing a sealing engagement between the substantially cylindrical body portion 824 and the first shaft 838.

At least a portion of the second end portion 854 of the flexible boot 850 is connected to at least a portion of the outer surface 840 of the first shaft 838 of the crash collapse assembly 802. According to an embodiment of the disclosure and as a non-limiting example, the second end portion 854 of the flexible boot 850 may be connected to the outer surface 840 of the first shaft 838 of the crash collapse assembly 802 by using a second boot retention member 862. As a non-limiting example, the second boot retention member 862 is a boot clamp.

Circumferentially extending along at least a portion of the outer surface 840 of the second end portion 844 of the first shaft 838 is a first increased diameter portion 864. In accordance with an embodiment of the disclosure and as a non-limiting example, the first increased diameter portion 864 on the second end portion 844 of the first shaft 838 may be substantially cylindrical in shape. It is within the scope of this disclosure and as a non-limiting example that the first increased diameter portion 864 of the first shaft 838 may have an outermost diameter OD2 that is greater than or substantially equal to a diameter D3 of said substantially cylindrical body portion 824 of said second joint member 808 of said crash collapse assembly 802.

Disposed directly adjacent to and axially outboard from the first increased diameter portion 864 of the first shaft 838 is a second increased diameter portion 866 having a first end portion 868 and a second end portion 870. In accordance with an embodiment of the disclosure and as a non-limiting example, the second increased diameter portion 866 of the first shaft 838 is substantially cylindrical in shape. It is within the scope of this disclosure, that the first and/or second increased diameter portions 864 and/or 866 may be one or more separate components that are integrally connected to at least a portion of the second end portion 844 of the first shaft 838. As a non-limiting example, the first and/or second increased diameter portion 864 and/or 866 may be integrally connected to the second end portion 844 of the first shaft 838 by using one or more adhesives, one or more mechanical fasteners, one or more welds and/or a threaded connection.

As illustrated in FIGS. 11-14 of the disclosure, a wall portion 872 extends from the outer surface 840 of the second increased diameter portion 864 of the first shaft 838 to an outermost surface 874 of the second increased diameter portion 866 of the first shaft 838 of the crash collapse assembly 802. It is therefore to be understood that the outermost diameter OD2 of the first increased diameter portion 864 may be less than an outermost diameter OD3 of the second increased diameter portion 866 of the first shaft 838 of the crash collapse assembly 802. The wall portion 872 of the second increased diameter portion 866 of the first shaft 838 has a thickness T4 capable of transmitting the rotational power of an engine (not shown) from one component of the shaft assembly 800 to another, but is thin enough to allow the crash collapse assembly 802 to collapse upon application of a pre-determined amount of force onto the wall portion 872. In accordance with the embodiment illustrated in FIGS. 11-14 and as a non-limiting example, the wall portion 872 may be substantially disk shaped. While the wall portion 872 illustrated in FIGS. 11-14 is substantially disk shaped, it is within the scope of this disclosure and as a non-limiting example that the wall portion 872 may take any shape to achieve the desired performance of the crash collapse assembly 802 of the shaft assembly 800. It is within the scope of this disclosure and as a non-limiting example, that the thickness T4 of the wall portion 872 may be from approximately 1 mm to approximately 4 mm.

Extending co-axially with the first shaft 838 and the second joint member 808 is a second shaft 876 having a first end portion 878, a second end portion (not shown), an inner surface 880 and an outer surface 882. The inner surface 880 and the outer surface 882 defines a hollow portion 884 therein. It is within the scope of this disclosure and as a non-limiting example that the second shaft 876 may be a propeller shaft, a prop shaft, a drive shaft, a driving shaft or any other type of shaft used to transfer rotational power from one component to another over a relatively large distance. It is within the scope of this disclosure and as a non-limiting example that the second shaft 876 may be made of an aluminum alloy, iron, an iron alloy, a steel alloy, a stainless steel alloy or a composite material.

According to an embodiment of the disclosure and as a non-limiting example, at least a portion of the first end portion 878 of the second shaft 876 is integrally connected to at least a portion of the increased diameter portion 866 of the first shaft 838 of the crash collapse assembly 802. In accordance with the embodiment of the disclosure illustrated in FIGS. 11, 13 and 14 and as a non-limiting example, at least a portion of the first end portion 878 of the second shaft 876 is received and/or retained within a reduced diameter portion 886 circumferentially extending along at least a portion of the outer surface 840 of the second end portion 870 of the second increased diameter portion 866 of the first shaft 838. As a non-limiting example, that the first end portion 878 of the second shaft 876 may be integrally connected to at least a portion of the increased diameter portion 866 of the first shaft 838 by using one or more adhesives, one or more mechanical fasteners, one or more welds and/or a threaded connection.

Figure 13:
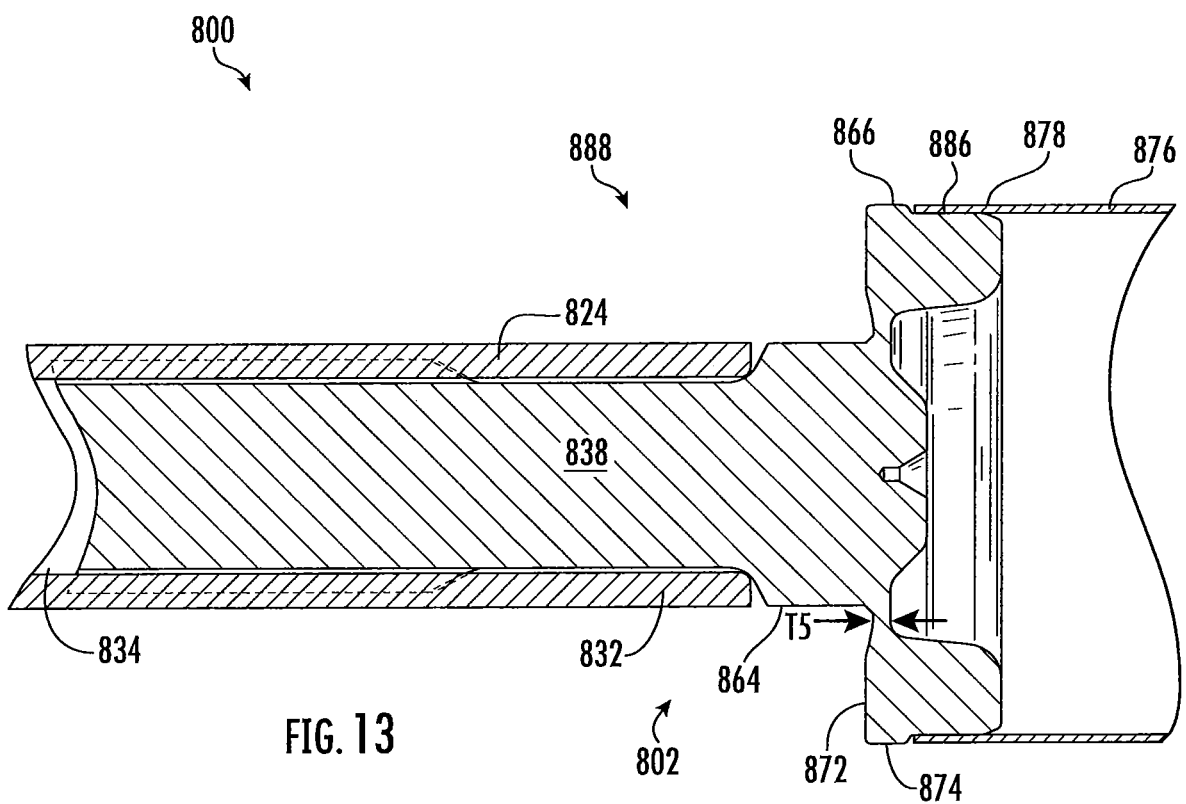
FIG. 13 is a cut-away schematic side-view of a portion of the shaft assembly illustrated in FIGS. 11 and 12 when the shaft assembly has experienced a crash condition.

As illustrated in FIG. 13 of the disclosure, when the shaft assembly 800 has experienced a crash condition 888. When the vehicle (not shown) experiences the crash condition 888 illustrated in FIG. 13 of the disclosure, first shaft 838 of the crash collapse assembly 802 is translated axially within the hollow portion 834 of the substantially cylindrical body portion 824 of the second joint member 808. According to an embodiment of the disclosure and as a non-limiting example, first shaft 838 is allowed to translate axially within the hollow portion 834 of the substantially cylindrical body portion 824 of the second joint member 808 until at least a portion of the second end portion 832 of the substantially cylindrical body portion 824 comes into direct contact with at least a portion of the first increased diameter portion 864 of the first shaft 838. In accordance with an alternative embodiment of the disclosure and as a non-limiting example, the first shaft 838 is allowed to translate axially within the hollow portion 834 of the substantially cylindrical body portion 824 until at least a portion of the second end portion 832 of the substantially cylindrical body portion 824 comes into direct contact with at least a portion of the wall portion 872.

Once the first shaft 838 has come into direct contact with the second joint member 808, an amount of force is applied to the wall portion 872 of the second increased diameter portion 866 of the first shaft 838 by the second shaft 876, the second joint member 808 and/or the first shaft 838 of the shaft assembly 802. As best seen in FIG. 13 of the disclosure, when the amount of force applied to the wall portion 872 of the second increased diameter portion 866 of the first shaft 838 reaches a pre-determined amount, the wall portion 872 will begin to cave in. If the amount of force experienced by the shaft assembly 800 is enough to cause the material of the wall portion 872 to plastically deform, the material of the wall portion 872 will experience necking. As best seen in FIG. 13 of the disclosure, when the material of the wall portion 872 experiences necking, the thickness T5 of the wall portion 872 will decrease.

Figure 14:
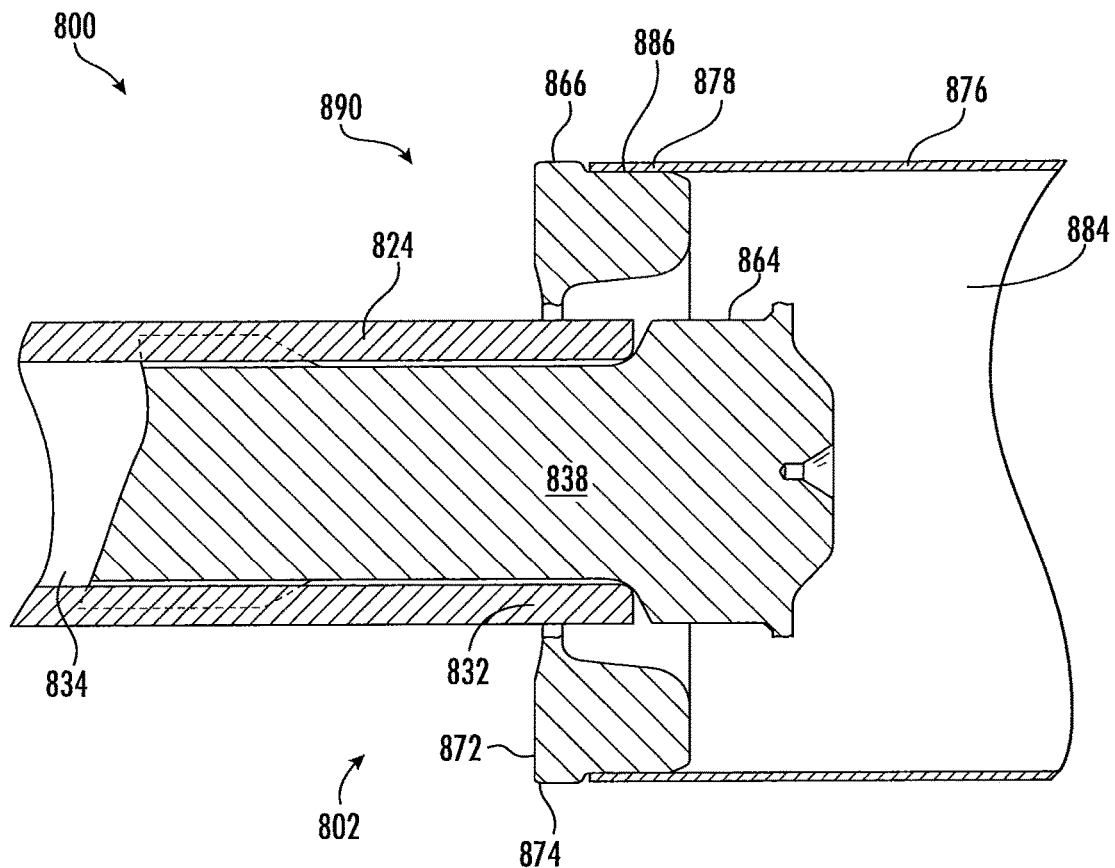
FIG. 14 is a cut-away schematic side-view of the portion of the shaft assembly illustrated in FIG. 13 when the shaft assembly is in a second position.

When the shaft assembly 800 is in a second position 890 illustrated in FIG. 14 of the disclosure, at least a portion of the first shaft 838 has separated from the second increased diameter portion 866 of the first shaft 838 thereby allowing the crash collapse assembly 802 to collapse. In accordance with the embodiment of the disclosure illustrated in FIG. 14, when the amount of force applied to the wall portion 872 reaches a pre-determined amount, the material of the wall portion 872 will fracture and separate the first shaft 838 from the increased diameter portion 866 of the first shaft 838. As a result, at least a portion of the first shaft 838, the first joint member 506, the second joint member 808, the one or more third joint members 510 and/or the flexible boot assembly 848 may translate axially into the hollow portion 884 of the second shaft 876 of the shaft assembly 800. It is within the scope of this disclosure, that the amount of force needed to fracture the material of the wall portion 872 of the second increased diameter portion 866 of the first shaft 838 is greater than the amount of force exerted onto the shaft assembly 800 when the vehicle (not shown) is in normal operation. This will allow the shaft assembly 800 to operate normally until the vehicle (not shown) experiences the crash condition 888.

According to an embodiment of the disclosure and as a non-limiting example, the amount of force needed to fracture the material of the wall portion 872 of the second increased diameter portion 866 of the first shaft 838 is from approximately 13 kN to approximately 75 kN. In accordance with an alternative embodiment of the disclosure and as a non-limiting example, the amount of force needed to fracture the material of the wall portion 872 of the second increased diameter portion 866 of the first shaft 838 is from approximately 60 kN to approximately 75 kN. It is to be understood, that the amount of force needed to fracture the wall portion 872 from the first shaft 838 can be altered by changing the material composition of the first shaft 838, the material composition of the wall portion 872, the material composition of the second increased diameter portion 866, the thickness T4 of the wall portion 872, the shape of the wall portion 872 and/or the ultimate tensile strength of the material of the wall portion 872 used. As a result, the crash collapse assembly 802 described herein is customizable and able to be used in a wide array of applications.

In accordance with an embodiment of the disclosure (not shown), the wall portion 872 may further include one or more crash collapse features (not shown). According to an embodiment of the disclosure and as a non-limiting example, the one or more crash collapse features (not shown) may include one or more notched portions (not shown) and/or one or more cut-back portions (not shown) that extend along at least a portion of an inner surface 892 and/or the outer surface 840 of the wall portion 872. The one or more notched portions (not shown) and/or the one or more cut-back portions (not shown), provide the wall portion 872 with a variable thickness. It is to be understood that the one or more notched portions (not show) and/or the one or more cut-back portions (not shown), may be used in order to ensure that the wall portion 872 of the second increased dimeter portion 866 of the first shaft 838 fractures at a pre-determined location and upon the application of a pre-determined amount of force. As a result, the amount of force needed to fracture the wall portion 872 from the first shaft 838 can be customized by altering the cross-sectional shape of the one or more notched portions (not shown), altering the cross-sectional shape of the one or more cut-back portions (not shown), the location(s) of the one or more notched portions (not shown), the locations(s) of the one or more cut-back portions (not shown), the thickness of the wall portion 872 at the thinnest point of the one or more notched portions (not shown) and/or the thickness of the wall portion 872 at the thinnest point of the one or more cut-back portions (not shown). It is within the scope of this disclosure and as a non-limiting example, that the one or more notched portions (not shown) and/or the one or more cut-back portions (not shown) may have a substantially V-shaped cross-sectional shape.

Figure 15:
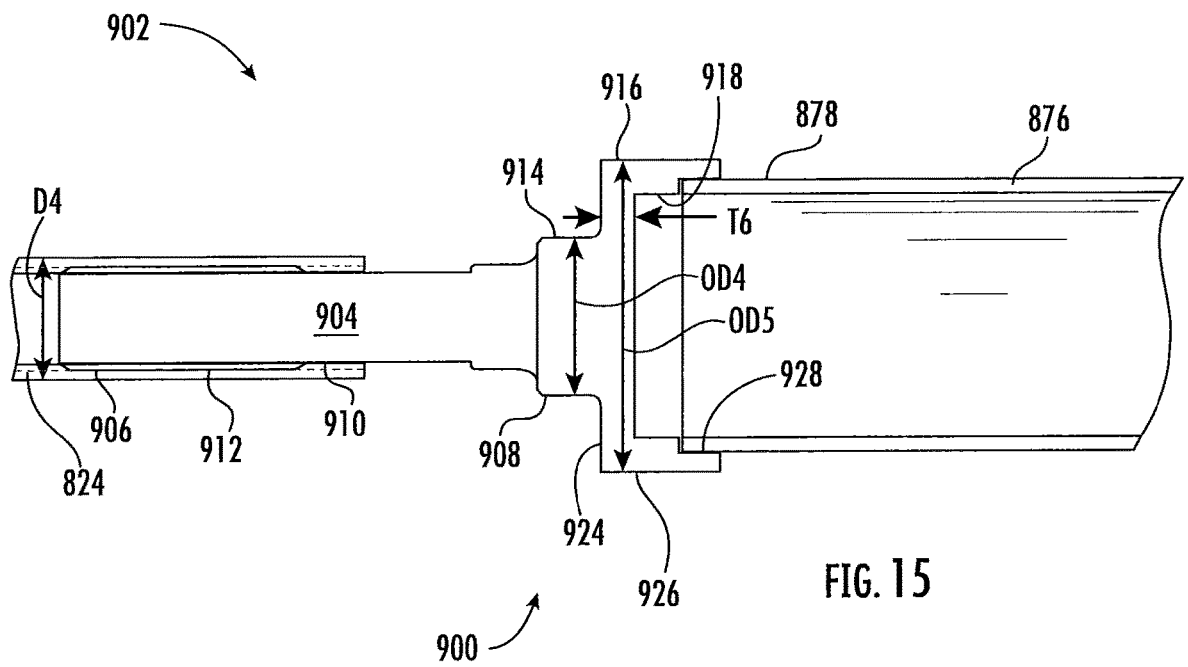
FIG. 15 is a cut-away schematic side-view of a portion of the shaft collapse assembly illustrated in FIGS. 11-14 according to an alternative embodiment of the disclosure.

FIG. 15 is a cut-away schematic side-view of a portion of a crash collapse assembly 900 of a shaft assembly 902 according to an alternative embodiment of the disclosure. The crash collapse assembly 900 illustrated in FIG. 15 of the disclosure is the same as the crash collapse assemblies 501, 700 and 802, except where specifically noted below. As illustrated in FIG. 15 of the disclosure, the crash collapse assembly 900 includes a first shaft 904 having a first end portion 906, a second end portion 908, and an outer surface 910. As illustrated in FIG. 15 of the disclosure, the first shaft 904 extends co-axially with the second joint member 808 of the shaft assembly 902. It is within the scope of this disclosure and as a non-limiting example that the first shaft 904 may be made of an aluminum alloy, iron, an iron alloy, a steel alloy, a stainless steel alloy or a composite material.

Circumferentially extending along at least a portion of the outer surface 910 of the first shaft 904 is a plurality of axially extending first shaft splines 912. The plurality of axially extending first shaft splines 912 are complementary to and meshingly engaged with the plurality of axially extending body portion splines 836 on the inner surface 826 of the substantially cylindrical body portion 824 of the second joint member 808.

As illustrated in FIG. 15 of the disclosure and as a non-limiting example, a first increased diameter portion 914 circumferentially extends from at least a portion of the outer surface 910 of the second end portion 908 of the first shaft 904. In accordance with an embodiment of the disclosure and as a non-limiting example, the first increased diameter portion 914 of the first shaft 904 may be substantially cylindrical shape. It is within the scope of this disclosure and as a non-limiting example that the first increased diameter portion 914 of the first shaft 904 may have an outermost diameter OD4 that is greater than or substantially equal to a diameter D4 of said substantially cylindrical body portion 824 of said second joint member 808 of said crash collapse assembly 900.

Disposed adjacent to and axially outboard from the first increased diameter portion 914 of the first shaft 904 is a second increased diameter portion 916. In accordance with an embodiment of the disclosure and as a non-limiting example, the second increased diameter portion 916 of the first shaft 904 may be substantially cylindrical in shape. It is within the scope of this disclosure, that the first and/or second increased diameter portions 914 and/or 916 may be one or more separate components that are integrally connected to at least a portion of the second end portion 908 of the first shaft 904. As a non-limiting example, the first and/or second increased diameter portions 914 and/or 916 may be integrally connected to the second end portion 908 of the first shaft 904 by using one or more adhesives, one or more mechanical fasteners, one or more welds and/or a threaded connection.

In accordance with the embodiment of the disclosure illustrated in FIG. 15, a wall portion 924 extends from the outer surface 910 of the first increased diameter portion 914 of the first shaft 904 to an outermost surface 926 of the second increased diameter portion 916 of the first shaft 904. It is therefore to be understood that the outermost diameter OD4 of the first increased diameter portion 914 may be less than an outermost diameter OD5 of the second increased diameter portion 916 of the first shaft 904 of the crash collapse assembly 900. The wall portion 924 of the second increased diameter portion 916 of the first shaft 904 has a thickness T6 that is capable of transmitting the rotational power of an engine (not shown) from one component of the shaft assembly 902 to another, but is thin enough to allow the crash collapse assembly 900 to collapse upon application of a pre-determined amount of force onto the wall portion 924. As illustrated in FIG. 15 of the disclosure and as a non-limiting example, the wall portion 924 may be substantially disk shaped. While the wall portion 924 illustrated in FIG. 15 is substantially disk shaped, it is within the scope of this disclosure and as a non-limiting example that the wall portion 924 may take any shape to achieve the desired performance of the crash collapse assembly 900 of the shaft assembly 902. It is within the scope of this disclosure and as a non-limiting example that the thickness T6 of the wall portion 924 may be from approximately 1 mm to approximately 4 mm.

According to an embodiment of the disclosure (not shown), the wall portion 924 may further include one or more crash collapse features (not shown). According to an embodiment of the disclosure and as a non-limiting example, the one or more crash collapse features (not shown) may include one or more notched portions (not shown) and/or one or more cut-back portions (not shown) that extend along at least a portion of an inner surface 918 and/or the outer surface 910 of the wall portion 924 of the second increased diameter portion 916 of the first shaft 904. The one or more notched portions (not shown) and/or the one or more cut-back portions (not shown) provide the wall portion 924 with a variable thickness. It is to be understood that the one or more notched portions (not show) and/or the one or more cut-back portions (not shown), may be used in order to ensure that the wall portion 924 of the increased dimeter portion 916 of the first shaft 904 fractures at a pre-determined location and upon the application of a pre-determined amount of force. As a result, the amount of force needed to fracture the wall portion 924 from the first shaft 904 can be customized by altering the cross-sectional shape of the one or more notched portions (not shown), altering the cross-sectional shape of the one or more cut-back portions (not shown), the location(s) of the one or more notched portions (not shown), the locations(s) of the one or more cut-back portions (not shown), the thickness of the wall portion 924 at the thinnest point of the one or more notched portions (not shown) and/or the thickness of the wall portion 924 at the thinnest point of the one or more cut-back portions (not shown). It is within the scope of this disclosure and as a non-limiting example, that the one or more notched portions (not shown) and/or the one or more cut-back portions (not shown) may have a substantially V-shaped cross-sectional shape.

Circumferentially extending along at least a portion of the inner surface 918 of the second increased diameter portion 916 of the first shaft 904 is a receiving portion 928. The receiving portion 928 in the inner surface 918 of the increased diameter portion 916 of the first shaft 904 is of a size and shape to receive and/or retain at least a portion of the first end portion 878 of the second shaft 876 of the shaft assembly 902. As a non-limiting example, the first end portion 878 of the second shaft 876 may be integrally connected to at least a portion of the increased diameter portion 916 of the first shaft 904 by using one or more adhesives, one or more mechanical fasteners, one or more welds and/or a threaded connection.

FIGS. 16 and 16A provide a schematic illustration of a portion of a shaft assembly 1000 having a first shaft 1002 and a crash collapse assembly 1001 according to yet another embodiment of the disclosure. The shaft assembly 1000 illustrated in FIGS. 16 and 16A is the same as the shaft assemblies 500, 701, 800 and/or 902 illustrated in FIGS. 5-15, except where specifically noted below. As illustrated in FIGS. 16 and 16A of the disclosure and as a non-limiting example, first shaft 1002 has the plurality of axially extending first shaft splines 846 circumferentially extending along at least a portion of the outer surface 840 of the first shaft 1002. The plurality of axially extending first shaft splines 846 of the first shaft 1002 are complementary to and meshingly engaged with the plurality of axially extending body portion splines 836 on the inner surface 826 of the substantially cylindrical body portion 824 of the second joint member 808.

The first shaft 1002 may further include the first increased diameter portion 864 and the second increased diameter portion 866 previously described herein. The first increased diameter portion 864 circumferentially extends from at least a portion of the outer surface 840 of the second end portion 844 of the first shaft 1002 and at least a portion of the second increased diameter portion 866 circumferentially extends from at least a portion of the outer surface 840 of the first increased diameter portion 864 of the first shaft 1002.

As best seen in FIG. 16 of the disclosure and as a non-limiting example, the second increased diameter portion 866 of the first shaft 1002 may include the reduced diameter portion 886 circumferentially extending along at least a portion of the outer surface 840 of the second end portion 870 of the second increased diameter portion 866 of the first shaft 1002. As previously described herein, the reduced diameter portion 886 of the second increased diameter portion 866 of the first shaft 1002 may be of a size and shape to receive and/or retain at least a portion of the first end portion 878 of the second shaft 876 of the shaft assembly 1000.

In accordance with the embodiment illustrated in FIGS. 16 and 16A of the disclosure and as a non-limiting example, the first shaft 1002 may include one or more axially extending ribs 1004. As best seen in FIG. 16 of the disclosure and as a non-limiting example, the one or more axially extending ribs 1004 of the first shaft 1002 may circumferentially extend along at least a portion of the inner surface 892 of the second increased diameter portion 866 of the first shaft 1002. According to an embodiment of the disclosure and as a non-limiting example, at least a portion of the one or more ribs 1004 of the first shaft 1002 may extend axially outward from at least a portion of the inner surface 892 of the wall portion 872 of the first shaft 1002. The one or more ribs 1004 of the first shaft 1002 may provide the second increased diameter portion 866 of the first shaft 1002 with increased strength that aids in improving the overall operability of the shaft assembly 100. Additionally, the one or more ribs 1004 of the first shaft 1002 may provide a gripping location for a machining apparatus (not shown) in order to securely retain the first shaft 1002 within the machining assembly (not shown). Once retained within the machining apparatus (not shown) the plurality of axially extending first shaft splines 846, the recessed portion 886 and/or the crash collapse feature (not shown) may be machined or formed into the first shaft 1002 of the shaft assembly 1000.

FIGS. 17 and 17A provide a cut-away schematic side-view of a portion of a shaft assembly 1100 having a first shaft 1102 and a crash collapse assembly 1101 according to still yet another embodiment of the disclosure. The shaft assembly 1100 illustrated in FIGS. 17 and 17A is the same as the shaft assemblies 500, 701, 800, 902 and/or 1000 illustrated in FIGS. 5-16A, except where specifically noted below. As best seen in FIG. 17 of the disclosure and as a non-limiting example, the first shaft 1102 has the plurality of axially extending first shaft splines 846 circumferentially extending along at least a portion of the outer surface 840 of the first shaft 1002. The plurality of axially extending first shaft splines 846 of the first shaft 1102 are complementary to and meshingly engaged with the plurality of axially extending body portion splines 836 on the inner surface 826 of the substantially cylindrical body portion 824 of the second joint member 808.

The first shaft 1102 may further include the first increased diameter portion 864 and the second increased diameter portion 866 previously described herein. As best seen in FIG. 17 of the disclosure and as a non-limiting example, the first increased diameter portion 864 circumferentially extends from at least a portion of the outer surface 840 of the second end portion 844 of the first shaft 1102 and at least a portion of the second increased diameter portion 866 circumferentially extends from at least a portion of the outer surface 840 of the first increased diameter portion 864 of the first shaft 1102.

According to the embodiment illustrated in FIG. 17 of the disclosure and as a non-limiting example, the second increased diameter portion 866 of the first shaft 1102 may include the reduced diameter portion 886 circumferentially extending along at least a portion of the outer surface 840 of the second end portion 870 of the second increased diameter portion 866 of the first shaft 1102. As previously described herein, the reduced diameter portion 886 of the second increased diameter portion 866 of the first shaft 1102 may be of a size and shape to receive and/or retain at least a portion of the first end portion 878 of the second shaft 876 of the shaft assembly 1100.

In accordance with the embodiment illustrated in FIGS. 17 and 17A and as a non-limiting example, the first shaft 1102 may include one or more first crash collapse features 1104 and/or one or more second crash collapse features 1106 defining a portion of the crash collapse assembly 1101. According to the embodiment illustrated in FIGS. 17 and 17A and as a non-limiting example, the one or more first crash collapse features 1104 and/or one or more second crash collapse features 1106 may be disposed in the wall portion 872 connecting the first increased diameter portion 864 to the second increased diameter portion 866 of the first shaft 1102. The one or more first and second crash collapse features 1104 and/or 1106 provide the wall portion 872 of the first shaft 1102 with a variable thickness. It is to be understood that the one or more first and second crash collapse features 1104 and/or 1106 may be used in order to ensure that the wall portion 872 of the first shaft 1102 fractures at a pre-determined location and upon the application of a pre-determined amount of force.

As best seen in FIG. 17A of the disclosure and as a non-limiting example, the one or more second crash collapse features 1106 may circumferentially extend inward from at least a portion of the inner surface 892 of the wall portion 872 and into the wall portion 872 of the first shaft 1102. According to the embodiment illustrated in FIG. 17A and as a non-limiting example, the one more second crash collapse features 1106 may have a cross-sectional shape that is defined by, in order, a first substantially convex portion 1108 having a radius R1, a first substantially straight portion 1110, a first substantially concave portion 1112 having a radius R2, a second substantially straight portion 1114, a second substantially concave portion 1116 having a radius R3, a third substantially straight portion 1118 and a second substantially convex portion 1120 having a radius R4. The one more second crash collapse features 1106 provide the wall portion 872 of the second shaft 1102 with are area of reduced thickness. As a non-limiting example that the one or more second crash collapse features may have a substantially U-shaped cross-sectional shape with an innermost diameter ID2 and an outermost diameter OD6. It is within the scope of this disclosure and as a non-limiting example that the radii R1 and R4 of the first and second substantially convex portions 1108 and 1120 of the one or more second crash collapse features 1106 may be substantially equal to each other. Additionally, it is within the scope of this disclosure and as a non-limiting example that the radii R2 and R3 of the first and second substantially concave portions 1112 and 1116 of the one or more second crash collapse features 1106 may be substantially equal to each other but may be less than the radii R1 and R4 of the first and second substantially convex portions 1108 and 1120.

The first substantially convex portion 1108 and the first substantially concave portion 1112 of the one or more second crash collapse features 1106 may be connected to opposing ends of the first substantially straight portion 1110 of the one or more second crash collapse features 1106. In accordance with the embodiment illustrated in FIG. 17A and as a non-limiting example, the first substantially straight portion 1110 of the one or more second crash collapse features 1106 extend inward from the inner surface 892 of the wall portion 872 and into the wall portion 872. It is within the scope of this disclosure and as a non-limiting example that the first substantially straight portion 1110 of the one or more second crash collapse features 1106 may extend at an angle θ1 relative to an axial centerline (not shown) of the first shaft 1102 of the shaft assembly 1100.

At least a portion of an end of the first substantially convex portion 1112 of the one or more second crash collapse features 1106 are connected to an end of the second substantially straight portion 1114 of the one or more second crash collapse features 1106 of the first shaft 1102. Additionally, at least a portion of the second substantially concave portion 1116 of the one or more second crash collapse features 1106 is connected to an end of the second substantially straight portion 1114 of the one or more second crash collapse features 1106 opposite the first substantially concave portion 1112. In accordance with the embodiment illustrated in FIG. 17A and as a non-limiting example, the second substantially straight portion 1114 of the one or more second crash collapse features 1106 may extend radially inward at an angle substantially perpendicular to the axial centerline (not shown) of the first shaft 1102 of the shaft assembly 1100. As a result, it is therefore to be understood that the first and second substantially straight portions 1110 and 1114 of the one or more second crash collapse features 1106 may be oblique to one another and form an obtuse angle.

Connected to at least a portion of an end of the second substantially concave portion 1116, opposite the second substantially straight portion 1114 of the one or more second crash collapse features 1106, is the third substantially straight portion 1118 of the one or more second crash collapse features 1106. Additionally, at least a portion of the second substantially convex portion 1120 of the one or more second crash collapse features 1106 is connected to an end of the third substantially straight portion 1118 of the one or more second crash collapse features 1106 opposite the second substantially concave portion 116 of the one or more second crash collapse features 1106. It is within the scope of this disclosure and as a non-limiting example that the third substantially straight portion 1118 of the one or more second crash collapse features 1106 may extend at an angle θ2 relative to an axial centerline (not shown) of the first shaft 1102 of the shaft assembly 1100. As a non-limiting example, the angle θ1 of the first substantially straight portion of the one or more second crash collapse features 1106 may be substantially equal to the angle θ2 of the third substantially straight portion 1118. As a non-limiting example, the angles θ1 and θ2 may be from approximately 5 degrees to approximately 15 degrees. Additionally, it is within the scope of this disclosure and as a non-limiting example that the second and third substantially straight portions 1114 and 118 of the one or more second crash collapse features 1106 may be oblique to one another and form an obtuse angle. As best seen in FIG. 17A of the disclosure and as a non-limiting example, at least a portion of the one or more first crash collapse features 1104 of the first shaft 1102 circumferentially extend along at least a portion of the outer surface 840 of the wall portion 872 into the wall portion 872 and toward the one or more second crash collapse features 1106 of the first shaft 1102. According to an embodiment of the disclosure and as a non-limiting example, the one or more first crash collapse features 1104 may have a cross-sectional length L1 and the one or more second crash collapse features 1106 may have a cross-sectional length L2. It is within the scope of this disclosure and as a non-limiting example that the length L1 of the one or more first crash collapse features 1104 may be substantially equal to the length L2 of the one or more second crash collapse features 1106 of the first shaft 1102 of the shaft assembly 1100.

In accordance with the embodiment illustrated in FIG. 17A and as a non-limiting example, the one or more first crash collapse features 1104 include a substantially concave portion 1122 having a radius R5 and a substantially straight portion 1124. At least a portion of the substantially concave portion 1122 of the one or more first crash collapse features 1104 may be disposed directly adjacent to the one or more first concave portions 1112 of the one or more second crash collapse features 1106 in the wall portion 872 of the first shaft 1102. It is within the scope of this disclosure and as a non-limiting example that the radius R5 of the substantially concave portion 1122 of the one or more first crash collapse features 1104 may be substantially equal to the radii R2 and R3 of the first and second substantially concave portions 1112 and 1116 of the one or more second crash collapse features 1106 in the first shaft 1102. Additionally, it is within the scope of this disclosure and as a non-limiting example that the radius R5 of the substantially concave portion 1122 of the one or more first crash collapse features 1104 may be less than the radii R1 and R4 of the first and second substantially convex portions 1108 and 1120 of the one or more second crash collapse features 1106 in the wall portion 872 of the first shaft 1102.

Extending from an end of the substantially concave portion 1122 of the one or more first crash collapse features 1104, away from the one or more second crash collapse features 1106, is the substantially straight portion 1124 of the one or more first crash collapse features 1104. As best seen in FIG. 17A of the disclosure and as a non-limiting example, the substantially straight portion 1124 of the one or more first crash collapse features 1104 extend at an angle θ3 relative to a radial centerline of the first shaft 1102 of the shaft assembly 1100. As a result, it is therefore to be understood that as the substantially straight portion 1124 of the one or more first crash collapse features 1104 extend away from the substantially concave portion 1122 of the one or more crash collapse features 1104, the thickness of the wall portion 872 of the first shaft 1102 increases. It is within the scope of this disclosure and as a non-limiting example that the angle θ3 of the substantially straight portion 1124 of the one or more first crash collapse features 1104 may be substantially equal to the angles θ1 and θ2 of the first and second substantially concave portions 1112 and 1116 of the one or more second crash collapse features 1106 of the first shaft 1102. As a non-limiting example the angle θ3 of the substantially straight portion 1124 of the one or more first crash collapse features 1104 may be from approximately 5 degrees to approximately 15 degrees.

As best seen in FIG. 17A of the disclosure and as a non-limiting example, one or more first crash collapse features 1104 in the wall portion 872 of the first shaft 1102 may have an innermost diameter ID3 and an outermost diameter OD7. It is within the scope of this disclosure and as a non-limiting example that the Innermost diameter ID3 of the one or more first crash collapse features 1104 may be greater than the innermost diameter ID2 of the one or more second crash collapse features 1106 but may be less than the outermost diameter OD6 of the one or more second crash collapse features 1106. Additionally, it is within the scope of this disclosure and as a non-limiting example that the outermost diameter OD7 of the one or more first crash collapse features may be greater than both the innermost diameter ID2 and the outermost diameter OD6 of the one or more second crash collapse features 1106 in the wall portion 872 of the first shaft 1102 of the shaft assembly 1100.

According to the embodiment illustrated in FIG. 17A and as a non-limiting example, the wall portion 872 of the first shaft 1102 may have a first thickness T7 and a second thickness T8. As best seen in FIG. 17A and as a non-limiting example, the thickness T7 of the wall portion 872 extends from the outer surface 840 of the wall portion 872 to the innermost point of the substantially concave portion 1122 of the one or more first crash collapse features 1104 of the first shaft 1102. Additionally, as best seen in FIG. 17A and as a non-limiting example, the thickness T8 of the wall portion 872 extends from the innermost point of the substantially concave portion 1122 of the one or more first crash collapse features 1104 to the second substantially straight portion 1114 of the one or more second crash collapse features 1106 in the inner surface 892 of the wall portion 872 of the first shaft 1102. It is to be understood that the thickness T7 and T8 of the wall portion may be optimized in order to ensure that the shaft assembly 1100 is able to transmit the rotational energy from the engine (not shown) of the vehicle (not show) while still allowing the shaft assembly 1100 to collapse upon the occurrence of a crash condition. As a non-limiting example that the thicknesses T7 may be substantially equal to the thickness T8.

By providing a first shaft 1102 with the one or more first and second crash collapse features 1104 and 1106 as described herein, it aids in ensuring that the shaft assembly 1100 has the strength needed to allow for the transition of an amount of rotational energy from the engine (not shown) of the vehicle (not shown). Additionally, by providing the first shaft 1102 with the one or more first and second crash collapse features 1104 and 1106 as described herein, it aids in ensuring that the shaft assembly 1100 will be able to collapse upon the application of a predetermined amount of force onto the one or more crash collapse features 1104 and 1106 in the wall portion 872 of the first shaft 1102. It is therefore to be understood that the geometry of the one or more first and second crash collapse features 1104 and 1106 is critical in order to ensure proper operation of the shaft assembly 1100 both during normal operation and upon the occurrence of a crash condition.

FIG. 18 is a cut-away schematic detail view of a portion of a portion of a first shaft 1200 of a shaft assembly 1203 having a crash collapse assembly 1201 with one or more first crash collapse features 1202 according to an alternative embodiment of the disclosure. The first shaft 1200 illustrated in FIG. 18 is the same as the first shaft 838, 904 and/or 1102 illustrated in FIGS. 11-17A, except where specifically noted below. As illustrated in FIG. 18 of the disclosure and as a non-limiting example, the one or more first crash collapse features 1202 have a substantially concave portion 1204 having a radius R6 and a the substantially straight portion 1124. At least portion of the substantially straight portion 1124 of the one or more first crash collapse features 1202 extend from an end of the substantially concave portion 1204 of the one or more first crash collapse features 1202 away from the one or more second crash collapse features 1106 in the wall portion 872 of the first shaft 1200.

In accordance with the embodiment illustrated in FIG. 18 of the disclosure and as a non-limiting example, at least a portion of the substantially concave portion 1204 of the one or more first crash collapse features 1202 may be disposed directly adjacent to the one or more first concave portions 1112 of the one or more second crash collapse features 1106 in the wall portion 872 of the first shaft 1200. It is within the scope of this disclosure and as a non-limiting example that the radius R6 of the substantially concave portion 1204 of the one or more first crash collapse features 1202 may be less than the radii R2 and R3 of the first and second substantially concave portions 1112 and 1116 of the one or more second crash collapse features 1106 in the first shaft 1200. Additionally, it is within the scope of this disclosure and as a non-limiting example that the radius R6 of the substantially concave portion 1204 of the one or more first crash collapse features 1202 may be less than the radii R1 and R4 of the first and second substantially convex portions 1108 and 1120 of the one or more second crash collapse features 1106 in the wall portion 872 of the first shaft 1200. Furthermore, it is within the scope of this disclosure and as a non-limiting example that the radius R6 of the substantially concave portion 1204 of the one or more first crash collapse features 1202 may be approximately one half of the radius R5 of the substantially concave portion 1122 of the one or more first crash collapse features 1104 described and illustrated in relation to FIGS. 17 and 17A of the disclosure.

FIG. 19 is a cut-away schematic detail view of a portion of a portion of a first shaft 1300 of a shaft assembly 1303 having a crash collapse assembly 1301 with one or more first crash collapse features 1302 according to an alternative embodiment of the disclosure. The first shaft 1300 illustrated in FIG. 19 is the same as the first shaft 838, 904, 1102 and/or 1200 illustrated in FIGS. 11-18, except where specifically noted below. As illustrated in FIG. 19 of the disclosure and as a non-limiting example, the one or more first crash collapse features 1302 have a substantially concave portion 1304 having a radius R7 and a the substantially straight portion 1124. At least portion of the substantially straight portion 1124 of the one or more first crash collapse features 1302 extend from an end of the substantially concave portion 1304 of the one or more first crash collapse features 1302 away from the one or more second crash collapse features 1106 in the wall portion 872 of the first shaft 1300.

In accordance with the embodiment illustrated in FIG. 19 of the disclosure and as a non-limiting example, at least a portion of the substantially concave portion 1304 of the one or more first crash collapse features 1302 may be disposed directly adjacent to the one or more first concave portions 1112 of the one or more second crash collapse features 1106 in the wall portion 872 of the first shaft 1300. It is within the scope of this disclosure and as a non-limiting example that the radius R7 of the substantially concave portion 1304 of the one or more first crash collapse features 1302 may be less than the radii R2 and R3 of the first and second substantially concave portions 1112 and 1116 of the one or more second crash collapse features 1106 in the first shaft 1300. Additionally, it is within the scope of this disclosure and as a non-limiting example that the radius R7 of the substantially concave portion 1304 of the one or more first crash collapse features 1302 may be less than the radii R1 and R4 of the first and second substantially convex portions 1108 and 1120 of the one or more second crash collapse features 1106 in the wall portion 872 of the first shaft 1300. Furthermore, it is within the scope of this disclosure and as a non-limiting example that the radius R7 of the substantially concave portion 1304 of the one or more first crash collapse features 1302 may be approximately one half of the radius R6 of the substantially concave portion 1204 of the one or more first crash collapse features 1202 described and illustrated in relation to FIG. 18 of the disclosure.

Figure 20:
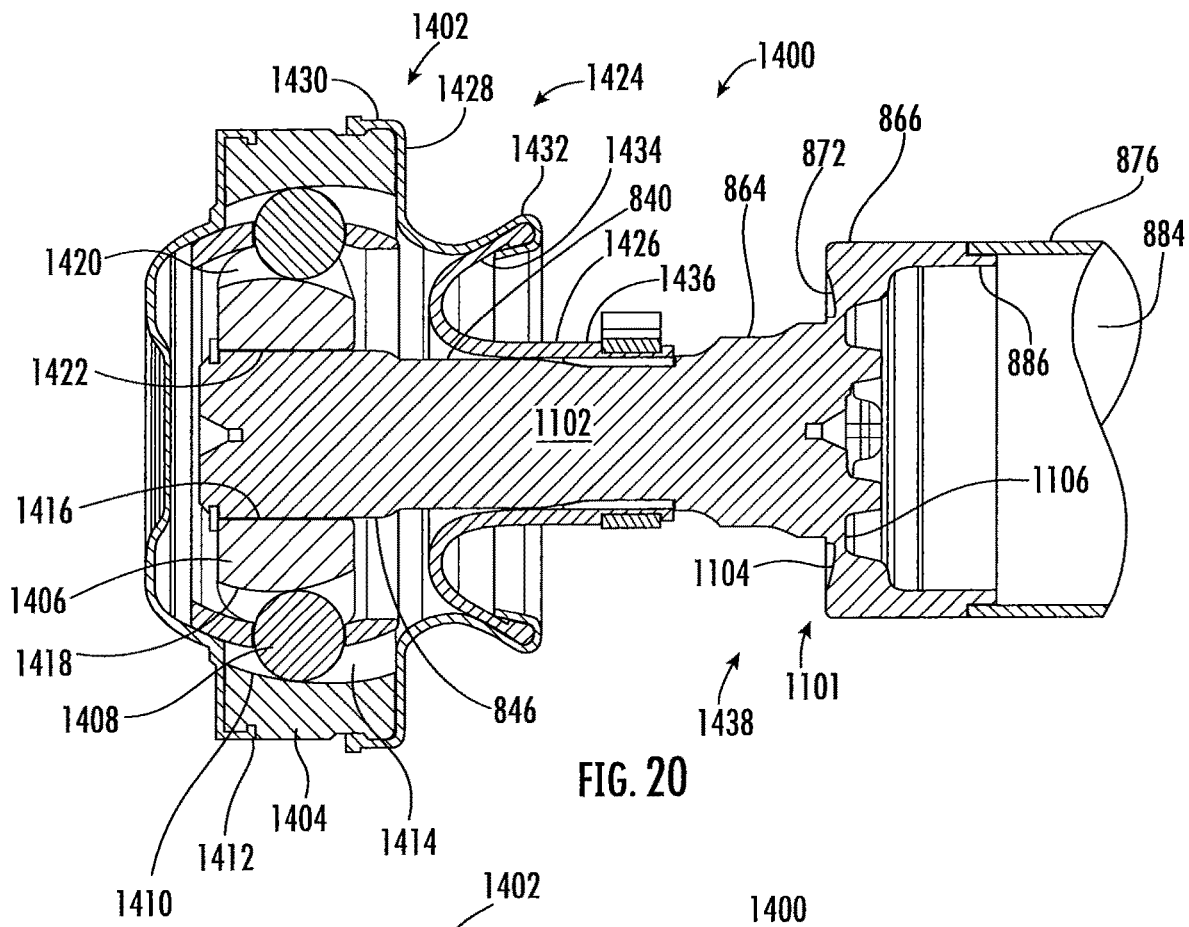
FIG. 20 is a cut-away schematic side-view of the shaft assembly illustrated in FIGS. 5-19 according to a further embodiment of the disclosure where the shaft assembly is in a first position.
Figure 20A:
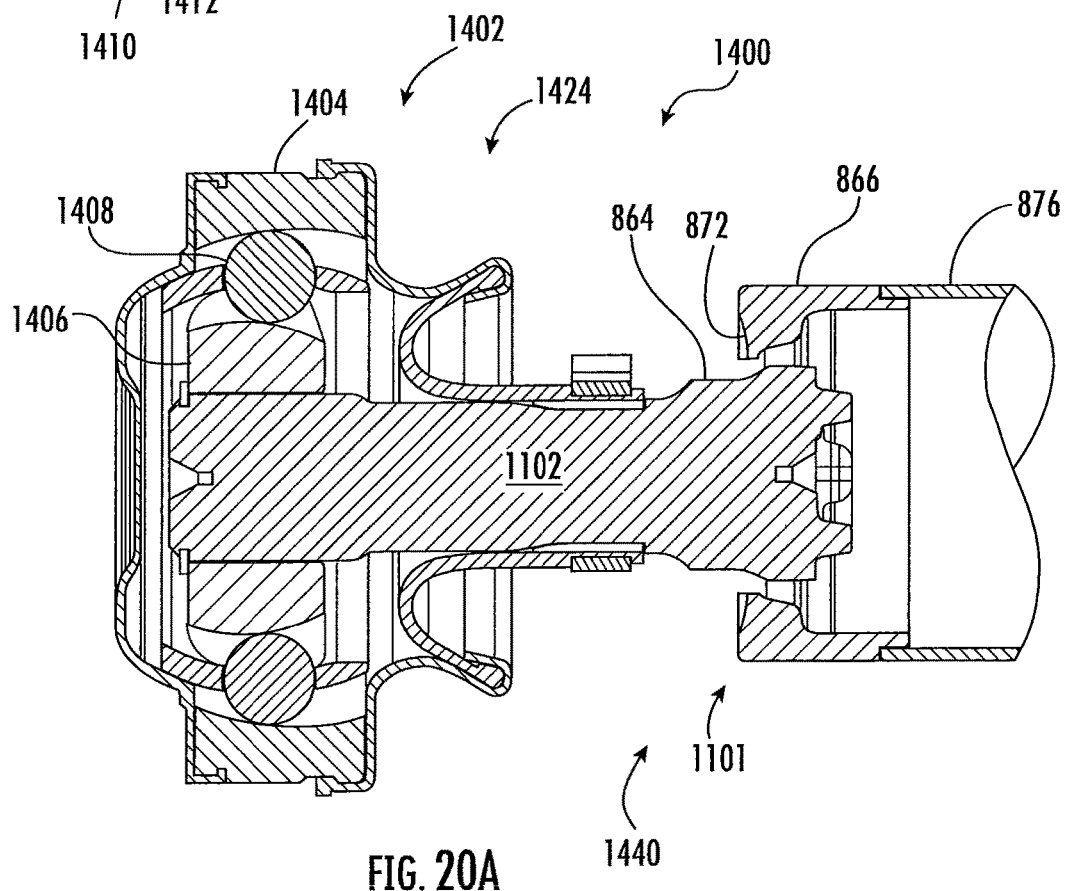
FIG. 20A is a cut-away schematic side-view of the shaft assembly illustrated in FIG. 20 when the shaft assembly has experienced a crash condition.

FIGS. 20 and 20A provide a cut-away schematic side-view of a shaft assembly 1400 having a joint assembly 1402 according to a further embodiment of the disclosure. The shaft assembly 1400 illustrated in FIGS. 20 and 20A is the same as the shaft assemblies 500, 701, 800, 902, 1000 and/or 1100 illustrated in FIGS. 5-19, except where specifically noted below. As illustrated in FIG. 20 and as a non-limiting example the joint assembly 1402 has a first joint member 1404, a second joint member 1406 and one or more third joint members 1408 drivingly connecting said first joint member 1404 to the second joint member 1406 of said joint assembly 1402. It is within the scope of this disclosure and as a non-limiting example that the joint assembly 1402 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

In accordance with the embodiment illustrated in FIG. 20 of the disclosure and as a non-limiting example, the first joint member 1404 have an inner surface 1410 and an outer surface 1412. Circumferentially extending along at least a portion of the inner surface 1412 of the first joint member 1404 is a plurality of first joint member grooves 1414. The one or more first joint member grooves 1414 may be of a size and shape to receive and/or retain at least a portion of the one or more third joint members 1408 of the joint assembly 1402.

Disposed radially inboard from at least a portion of the first joint member 1404 is the second joint member 1406 of the joint assembly 1402. As best seen in FIG. 20 of the disclosure and as a non-limiting example, the second joint member 1406 has an inner surface 1416 and an outer surface 1418. Circumferentially extending along at least a portion of the outer surface 1418 of the second joint member 1406 is a plurality of second joint member grooves 1420. The plurality of second joint member grooves 1420 may be of a size and shape to receive and/or retain at least a portion of the one or more third joint members 1408 of the joint assembly 1402.

Circumferentially extending along at least a portion of the inner surface 1416 of the second joint member 1406 is a plurality of axially extending second joint member splines 1422. The plurality of axially extending second joint member splines 1422 are complementary to and meshingly engaged with the plurality of axially extending first shaft splines 846 on the outer surface 840 of the first shaft 1102 of the shaft assembly 1400 illustrated in FIGS. 20 and 20A of the disclosure. As a result, it is therefore to be understood that the second joint member 1406 of the joint assembly 1402 may be drivingly connected to at least a portion of the first shaft 1102 of the shaft assembly 1400.

As best seen in FIG. 20 of the disclosure and as a non-limiting example, the joint assembly 1402 of the shaft assembly 1400 may further include a boot assembly 1424. In accordance with the embodiment illustrated in FIG. 20 and as a non-limiting example, the boot assembly 1424 may include a flexible boot 1426 and/or a boot can 1428. The boot can 1428 has a first end portion 1430 and a second end portion 1432 and the flexible boot 1426 has a first end portion 1434 and a second end portion 1436. At least a portion of the first end portion 1430 of the boot can 1428 may be connected to at least a portion of the outer surface 1412 of the first joint member 1404 and at least a portion of the second end portion 1432 of the boot can 1428 may be connected to at least a portion of the first end portion 1434 of the flexible boot 1426. Additionally, at least a portion of the second end portion 1436 of the flexible boot 1426 may be connected to at least a portion of the outer surface 840 of the first shaft 1102 of the shaft assembly 1400.

When the shaft assembly 1400 is in the position illustrated in FIG. 20, the shaft assembly 1400 is in a first position 1438. When in the first position 1438, the shaft assembly 1400 is in a normal operating position. Upon the occurrence of a crash condition 1440, the second shaft 876, the first shaft 1102 and/or the joint assembly 1402 apply an amount of force onto the wall portion 872 and the one or more first and second crash collapse features 1104 and 1106 of the crash collapse assembly 1101 of the shaft assembly 1400. Once a pre-determined amount of force has been applied to the wall portion 872 and the one or more first and second crash collapse features 1104 and 1106 of the shaft assembly 1400, the wall portion 872 will fracture allowing at least a portion of the first shaft 1102, the joint assembly 1402 and/or the boot assembly 1424 to translate axially into the hollow portion 884 of the second shaft 876 of the shaft assembly 1400.

Figure 21:
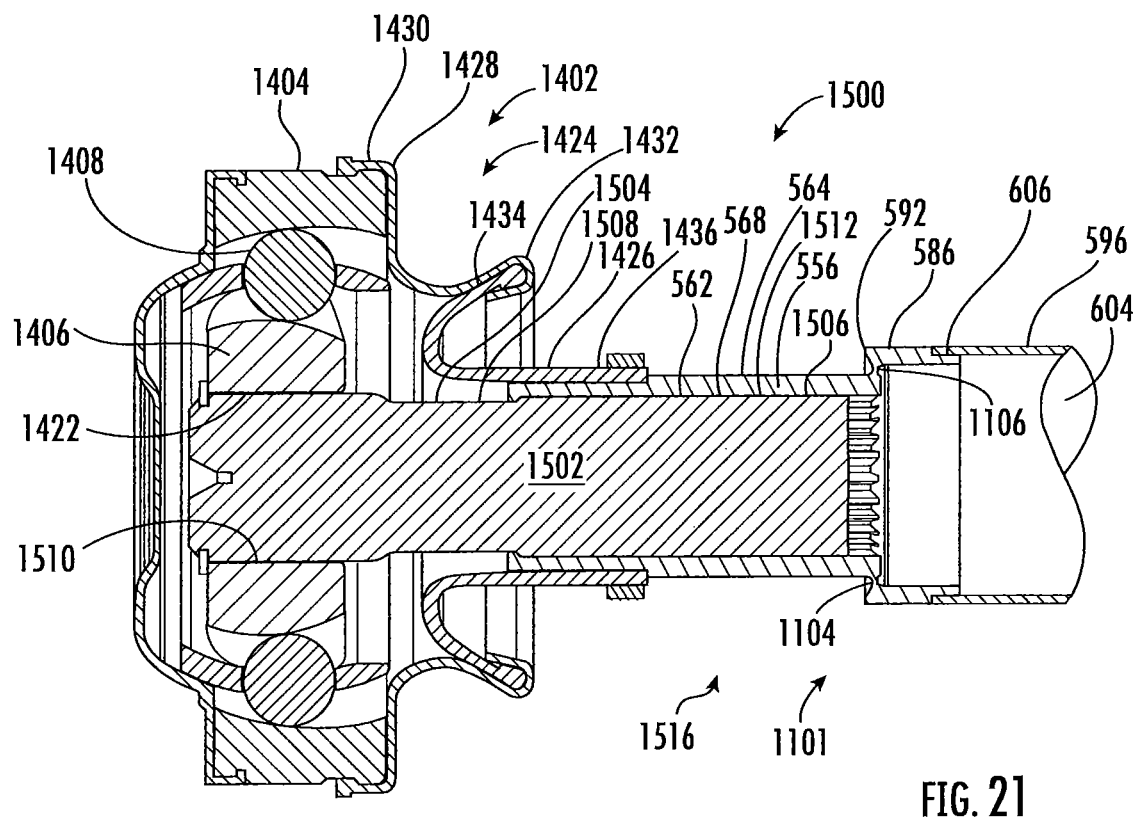
FIG. 21 is a cut-away schematic side-view of the shaft assembly illustrated in FIGS. 5-20 according to yet a further embodiment of the disclosure where the shaft assembly is in a first position.
Figure 21A:
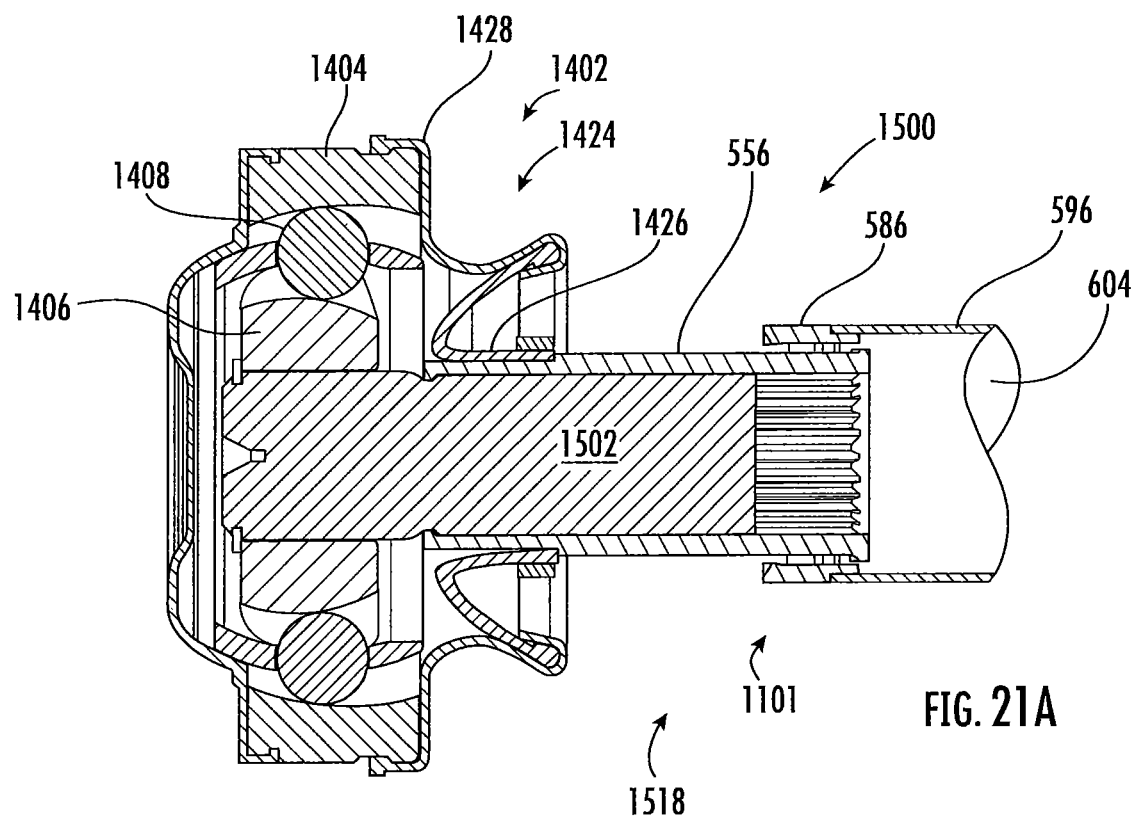
FIG. 21A is a cut-away schematic side-view of the shaft assembly illustrated in FIG. 21 when the shaft assembly has experienced a crash condition.

FIGS. 21 and 21A provide a cut-away schematic side-view of a shaft assembly 1500 according to yet a further embodiment of the disclosure where the shaft assembly 1500 has the joint assembly 1402 drivingly connected to at least a portion of the first shaft 702. The shaft assembly 1500 illustrated in FIGS. 21 and 21A is the same as the shaft assemblies 500, 701, 800, 902, 1000, 1100 and/or 1400 illustrated in FIGS. 5-20A, except where specifically noted below. As illustrated in FIG. 21 of the disclosure and as a non-limiting example, the first shaft 556 of the shaft assembly 1500 may include the crash collapse assembly 1101 with the one or more first and second crash collapse features 1104 and 1106 in the outer and inner surface 564 and 562 of the wall portion 592 of the first shaft 564.

As best seen in FIG. 21 of the disclosure and as a non-limiting example, the shaft assembly 1500 includes a third shaft 1502 having a first end portion 1504, a second end portion 1506 and an outer surface 1508. Circumferentially extending from at least a portion of the outer surface 1508 of the first end portion 1504 of the third shaft 1502 is a first plurality of axially extending third shaft splines 1510. The first plurality of axially extending third shaft splines 1510 on the third shaft 1502 are complementary to and meshingly engaged with the plurality of axially extending second joint member splines 1422 on the inner surface 1416 of the second joint member 1406 of the joint assembly 1402 of the shaft assembly 1500.

Circumferentially extending from at least a portion of the outer surface 1508 of the second end portion 1506 of the third shaft 1502 is a second plurality of axially extending third shaft splines 1512. The second plurality of axially extending third shaft splines 1514 are complementary to and meshingly engaged with the plurality of axially extending first shaft splines 568 on the inner surface 562 of the first shaft 564 of the shaft assembly 1500.

In accordance with the embodiment illustrated in FIGS. 21 and 21A of the disclosure and as a non-limiting example, the joint assembly 1402 of the shaft assembly 1500 may include the boot can 1428 and/or the flexible boot 1426. As illustrated in FIGS. 21 and 21A of the disclosure and as a non-limiting example, at least a portion of the first end portion 1434 of the flexible boot 1426 may be connected to at least a portion of the second end portion 1432 of the boot can 1428 and at least a portion of the second end portion 1436 of the flexible boot 1426 may be connected to at least a portion of the outer surface 564 of the first shaft 556 of the shaft assembly 1500.

When the shaft assembly 1500 is in the position illustrated in FIG. 21, the shaft assembly 1500 is in a first position 1516. When in the first position 1516, the shaft assembly 1500 is in a normal operating position. Upon the occurrence of a crash condition 1518, at least a portion of the first shaft 564 will come into direct contact with and abut at least a portion of the third shaft 1502 and/or the second joint member 1406 of the joint assembly 1402 of the shaft assembly 1500. Once the first shaft 564 is in contact with the third shaft 1502 and/or the second joint member 1406, the first shaft 564, the second shaft 596 and/or the third shaft 1502 will apply an amount of force onto the wall portion 592 and the one or more first and second crash collapse features 1104 and 1106 of the crash collapse assembly 1101 of the shaft assembly 1500. Upon the application of a pre-determined amount of force onto the wall portion 872 and the one or more first and second crash collapse features 1104 and 1106 of the shaft assembly 1500, the wall portion 592 will fracture allowing at least a portion of the first shaft 564, the third shaft 1502, the joint assembly 1402 and/or the boot assembly 1424 to translate axially into the hollow portion 604 of the second shaft 596 of the shaft assembly 1500.

The crash collapse assemblies 501, 700, 802, 900, 1001, 1101, 1201 and/or 1301 disclosed herein will aid in preventing the shaft assemblies 500, 701, 800, 902, 1000, 1100, 1203, 1303, 1400 and/or 1500 from buckling and injuring vehicle passengers (not shown) when the vehicle (not shown) experiences a crash condition. Additionally, the crash collapse assemblies 501, 700, 802, 900, 1001, 1101, 1201 and/or 1301 will aid in preventing the shaft assemblies 500, 701, 800, 902, 1000, 1100, 1203, 1303, 1400 and/or 1500 from translating an amount of the forces experienced by the shaft assemblies 500, 701, 800, 902, 1000, 1100, 1203, 1303, 1400 and/or 1500 during a crash condition to nearby components (not shown) in the vehicle driveline and damaging those nearby components (not shown). As a result, the crash collapse assemblies 501, 700, 802, 900, 1001, 1101, 1201 and/or 1301 and the shaft assemblies 500, 701, 800, 902, 1000, 1100, 1203, 1303, 1400 and/or 1500 described herein will aid in increasing the overall crash safety rating of the vehicle (not shown).

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A shaft assembly, comprising:
a joint assembly having a first joint member, a second joint member and one or more third joint members drivingly connecting said first joint member to said second joint member;
a first shaft having an inner surface, an outer surface, a first end portion, and a second end portion;
wherein at least a portion of said first shaft is drivingly connected to at least a portion of said second joint member of said joint assembly;
wherein an increased diameter portion circumferentially extends form at least a portion of said outer surface of said second end portion of said first shaft;
wherein a wall portion extends from said outer surface of said first shaft to an outermost surface of said increased diameter portion of said first shaft;
wherein said wall portion of said first shaft further comprises one or more first crash collapse features, one or more second crash collapse features, and/or one or more ribs;
wherein said one or more first and/or second crash collapse features circumferentially extend inward into said wall portion of said first shaft from at least a portion of said outer surface and/or an inner surface of said wall portion; and
wherein said one or more ribs circumferentially extend along at least a portion of an inner surface of said second increased diameter portion of said first shaft;
a second shaft;
wherein at least a portion of a first end portion of said second shaft is drivingly connected to at least a portion of said increased diameter portion of said first shaft; and
wherein upon the occurrence of a crash condition a force is applied onto said wall portion of said first shaft until said wall portion fractures allowing at least a portion of said joint assembly and/or said first shaft to translate axially into a hollow portion of said second shaft.

2. The shaft assembly of claim 1, wherein said second joint member has a first end portion, a second end portion and an intermediate portion interposed there between;
wherein said second joint member has a substantially cylindrical body portion extending outward from at least a portion of said intermediate portion of said second joint member;
wherein a plurality of axially extending first shaft splines circumferentially extend along at least a portion of said inner surface of said first shaft that are complementary to and meshingly engaged with plurality of axially extending body portion splines circumferentially extending from at least a portion of said outer surface of said substantially cylindrical body portion of said second joint member; and
wherein upon the occurrence of a crash condition at least a portion of said first shaft comes into direct contact with at least a portion of said second joint member and a force is applied onto said wall portion of said first shaft until said wall portion fractures allowing at least a portion of said joint assembly and/or said first shaft to translate axially into a hollow portion of said second shaft.

3. The shaft assembly of claim 1, further comprising a third shaft having a first end portion a second end portion and an outer surface;
wherein a first plurality of axially extending third shaft splines circumferentially extend along at least a portion of said outer surface of said second end portion of said third shaft that are complementary to and meshingly engaged with a plurality of axially extending second joint member splines circumferentially extending along at least a portion of an inner surface of said second joint member; and
wherein a second plurality of axially extending second shaft splines circumferentially extend along at least a portion of said outer surface of said second end portion of said second shaft that are complementary to and meshingly engaged with a plurality of axially extending first shaft splines circumferentially extending along at least a portion of said inner surface of said first shaft; and
wherein upon the occurrence of a crash condition at least a portion of said first shaft comes into direct contact with at least a portion of said second joint member and/or said third shaft applying an amount of force onto said wall portion of said first shaft until said wall portion fractures allowing at least a portion of said joint assembly and/or said first shaft to translate axially into said hollow portion of said second shaft.

4. The shaft assembly of claim 1, wherein said outer surface of said second end portion of said increased diameter portion of said first shaft comprises a reduced diameter portion, and wherein at least a portion of said first end portion of said second shaft is received and/or retained within at least a portion of said reduced diameter portion in said increased diameter portion of said first shaft; and/or
wherein said increased diameter portion of said first shaft comprises a receiving portion circumferentially extending along at least a portion of said inner surface of said second end portion of said increased diameter portion, and wherein at least a portion of said first end portion of said second shaft is received and/or retained within at least a portion of said receiving portion in said increased diameter portion of said first shaft.

5. The shaft assembly of claim 1, further comprising a boot assembly;
wherein upon the occurrence of a crash condition at least a portion of said boot assembly translates axially into said hollow portion of said second shaft.

6. The shaft assembly of claim 1, wherein said wall portion of said first shaft has a variable thickness; and
wherein said thickness of said wall portion of said first shaft is capable of transmitting the rotational power while still allowing said wall portion to fracture upon said occurrence of a crash condition.

7. The shaft assembly of claim 1, wherein said one or more second crash collapse features have a substantially U-shaped cross-sectional shape; and/or
wherein said one or more second crash collapse features comprise, in axial order, a first substantially convex portion, a first substantially straight portion, a first substantially concave portion, a second substantially straight portion, a second substantially concave portion, a third substantially straight portion and a second substantially convex portion.

8. The shaft assembly of claim 7, wherein said one or more first crash collapse features in said wall portion of said first shaft comprise a substantially concave portion and a substantially straight portion; and
wherein said substantially concave portion of said one or more first crash collapse features in said outer surface of said wall portion of said first shaft is disposed adjacent to said first substantially concave portion of said one or more second crash collapse features in said inner surface of said wall portion of said first shaft.

9. The shaft assembly of claim 7, wherein said first substantially straight portion of said one or more second crash collapse features extends at an angle θ1 relative to a centerline of said first shaft;
wherein said second substantially straight portion of said one or more second crash collapse features extends substantially perpendicular to said centerline of said first shaft; and
wherein said third substantially straight portion of said one or more second crash collapse features extends at an angle θ2 relative to said centerline of said first shaft.

10. The shaft assembly of claim 1, wherein said one or more first crash collapse features in said wall portion of said first shaft comprise a substantially concave portion and a substantially straight portion; and
wherein said substantially straight portion of said one or more first crash collapse features extend at an angle θ3 relative to said centerline of said first shaft.

11. The shaft assembly of claim 1, wherein said one or more first crash collapse features in said outer surface of said wall portion of said first shaft have an innermost diameter and an outermost diameter;
wherein said one or more second crash collapse features in said inner surface of said wall portion of said first shaft have an innermost diameter and an outermost diameter;
wherein said innermost diameter of said one or more first crash collapse features is greater than said innermost diameter of said one or more second crash collapse features but less than said outermost diameter of said one or more second crash collapse features in said first shaft; and
wherein said outermost diameter of said one or more first crash collapse features is greater than said innermost diameter and said outermost diameter of said one or more second crash collapse features in said first shaft.

12. A shaft assembly, comprising:
a joint assembly having a first joint member, a second joint member and one or more third joint members drivingly connecting said first joint member to said second joint member;
a first shaft having an outer surface, a first end portion and a second end portion;
wherein at least a portion of said first shaft is drivingly connected to at least a portion of said second joint member;
wherein a first increased diameter portion circumferentially extends form at least a portion of said outer surface of said second end portion of said first shaft;
wherein a second increased diameter portion having a first end portion and a second end portion circumferentially extends from at least a portion of an outermost surface of said first increased diameter portion of said first shaft;
wherein a wall portion connects said first increased diameter portion of said first shaft to said second increased diameter portion of said first shaft;
a second shaft;
wherein at least a portion of a first end portion of said second shaft is drivingly connected to at least a portion of said second increased diameter portion of said first shaft;
wherein upon the occurrence of a crash condition a force is applied onto said wall portion of said first shaft until said wall portion fractures allowing at least a portion of said joint assembly and/or said first shaft to translate axially into a hollow portion of said second shaft; and
wherein said first shaft further comprises one or more first crash collapse features, one or more second crash collapse features, and/or one or more ribs;
wherein said one or more first crash collapse features circumferentially extend inward into said wall portion of said first shaft from at least a portion of said outer surface and/or an inner surface of said wall portion; and
wherein said one or more ribs circumferentially extend along at least a portion of an inner surface of said second increased diameter portion of said first shaft.

13. The shaft assembly of claim 12, wherein said second joint member has a first end portion, a second end portion and an intermediate portion interposed therebetween;
wherein said second joint member has a substantially cylindrical body portion extending outward from at least a portion of said intermediate portion of said second joint member;
wherein a plurality of axially extending first shaft splines circumferentially extend along at least a portion of said outer surface of said first shaft that are complementary and meshingly engaged with a plurality of axially extending body portion splines circumferentially extending along at least a portion of an inner surface of said substantially cylindrical body portion of said second joint member; and
wherein upon the occurrence of a crash condition at least a portion of an end portion of said substantially cylindrical body portion of said second joint member comes into direct contact with at least a portion of said first increased diameter portion of said first shaft and a force is applied onto said wall portion of said first shaft until said wall portion fractures allowing at least a portion of said joint assembly and/or said first shaft to translate axially into said hollow portion of said second shaft.

14. The shaft assembly of claim 12, wherein said outer surface of said second end portion of said second increased diameter portion of said first shaft comprises a reduced diameter portion, and wherein at least a portion of said first end portion of said second shaft is received and/or retained within at least a portion of said reduced diameter portion in said second increased diameter portion of said first shaft; and/or
wherein said second increased diameter portion of said first shaft comprises a receiving portion circumferentially extending along at least a portion of an inner surface of said second increased diameter portion of said first shaft, and wherein at least a portion of said first end portion of said second shaft is received and/or retained within at least a portion of said receiving portion in said second increased diameter portion of said first shaft.

15. The shaft assembly of claim 12, further comprising a boot assembly;
wherein upon the occurrence of a crash condition at least a portion of said boot assembly translates axially into said hollow portion of said second shaft.

16. The shaft assembly of claim 12, wherein said wall portion of said first shaft has a variable thickness; and
wherein said thickness of said wall portion of said first shaft is capable of transmitting the rotational power while still allowing said wall portion to fracture upon said occurrence of a crash condition.

17. The shaft assembly of claim 12, wherein said one or more second crash collapse features have a substantially U-shaped cross-sectional shape; and/or wherein said one or more second crash collapse features comprise, in axial order, a first substantially convex portion, a first substantially straight portion, a first substantially concave portion, a second substantially straight portion, a second substantially concave portion, a third substantially straight portion and a second substantially convex portion.

18. The shaft assembly of claim 17, wherein said first substantially straight portion of said one or more second crash collapse features extends at an angle θ1 relative to a centerline of said first shaft;

wherein said second substantially straight portion of said one or more second crash collapse features extends substantially perpendicular to said centerline of said first shaft; and wherein said third substantially straight portion of said one or more second crash collapse features extends at an angle θ2 relative to said centerline of said first shaft.

19. The shaft assembly of claim 17, wherein said one or more first crash collapse features in said wall portion of said first shaft comprise a substantially concave portion and a substantially straight portion; and wherein said substantially concave portion of said one or more first crash collapse features in said wall portion of said first shaft is disposed adjacent to said first substantially concave portion of said one or more second crash collapse features in said wall portion of said first shaft.

20. The shaft assembly of claim 12, wherein said one or more first crash collapse features in said wall portion of said first shaft comprise a substantially concave portion and a substantially straight portion; and wherein said substantially straight portion of said one or more first crash collapse features extend at an angle θ3 relative to said centerline of the first shaft.

21. The shaft assembly of claim 12, wherein said one or more first crash collapse features in said outer surface of said wall portion of said first shaft have an innermost diameter and an outermost diameter;

wherein said one or more second crash collapse features in said inner surface of said wall portion of said first shaft have an innermost diameter and an outermost diameter;

wherein said innermost diameter of said one or more first crash collapse features is greater than said innermost diameter of said one or more second crash collapse features but less than said outermost diameter of said one or more second crash collapse features in said first shaft; and wherein said outermost diameter of said one or more first crash collapse features is greater than said innermost diameter and said outermost diameter of said one or more second crash collapse features in said first shaft.

* * * * *